(12) United States Patent
Ikeno et al.

(10) Patent No.: US 9,751,240 B2
(45) Date of Patent: Sep. 5, 2017

(54) RESIN VEHICLE PART MANUFACTURING METHOD AND RESIN VEHICLE PART

(71) Applicant: TOYOTA SHATAI KABUSHIKI KAISHA, Kariya-shi, Aichi (JP)

(72) Inventors: Katsuya Ikeno, Kariya (JP); Tomohiro Arakawa, Nagoya (JP); Yoshihisa Yamashita, Kariya (JP); Nobuyoshi Nishikawa, Obu (JP)

(73) Assignee: Toyota Shatai Kabushiki Kaisha, Kariya-shi (JP)

( * ) Notice: Subject to any disclaimer, the term of this patent is extended or adjusted under 35 U.S.C. 154(b) by 64 days.

(21) Appl. No.: 14/413,844

(22) PCT Filed: Dec. 26, 2013

(86) PCT No.: PCT/JP2013/084799
§ 371 (c)(1),
(2) Date: Jan. 9, 2015

(87) PCT Pub. No.: WO2014/112312
PCT Pub. Date: Jul. 24, 2014

(65) Prior Publication Data
US 2015/0306791 A1    Oct. 29, 2015

(30) Foreign Application Priority Data

Jan. 15, 2013 (JP) ................. 2013-004421

(51) Int. Cl.
*B29C 33/42* (2006.01)
*B29C 45/37* (2006.01)
(Continued)

(52) U.S. Cl.
CPC .............. *B29C 33/42* (2013.01); *B29C 45/37* (2013.01); *B29C 45/44* (2013.01); *B29C 45/56* (2013.01);
(Continued)

(58) Field of Classification Search
CPC . B29C 33/42; B29C 45/44; B29L 2031/3041; B60R 2019/1886
See application file for complete search history.

(56) References Cited

U.S. PATENT DOCUMENTS 4,388,355 A * 6/1983 Ikemizu ................. B60R 13/04
293/1
4,828,902 A * 5/1989 Welygan ................. B29C 47/12
428/105
(Continued)

FOREIGN PATENT DOCUMENTS

JP      A-5-50474      3/1993
JP      A-8-66933      3/1996
(Continued)

OTHER PUBLICATIONS

Apr. 15, 2014 International Search Report issued in International Application No. PCT/JP2013/084799.

*Primary Examiner* — Donald J Loney
(74) *Attorney, Agent, or Firm* — Oliff PLC

(57) ABSTRACT

A method for manufacturing a resin vehicle part provided with a panel body having a decorative surface on the front surface and a stepped reinforcing rib, which stands on the back surface of the panel body and the thickness of the base end of which is formed to be thinner than the thickness of the leading end. On the injection molding die thereof, a sliding piece for forming the stepped reinforcing rib is provided so as to be movable. During shrinkage movement of the stepped reinforcing rib in the height direction after molten resin has been filled in the injection molding die, the sliding piece is pressed by the leading end of the stepped reinforcing rib and moves towards the panel body.

9 Claims, 18 Drawing Sheets

(51) Int. Cl.
    *B29C 45/56* (2006.01)
    *B60R 19/18* (2006.01)
    *B29C 45/44* (2006.01)
    *B29L 31/30* (2006.01)
    *B29C 45/36* (2006.01)

(52) U.S. Cl.
    CPC ........ *B60R 19/18* (2013.01); *B29C 2045/363* (2013.01); *B29L 2031/3005* (2013.01); *B29L 2031/3041* (2013.01); *B60R 2019/1886* (2013.01)

(56) References Cited

U.S. PATENT DOCUMENTS

| | | | | |
|---|---|---|---|---|
| 5,263,792 | A * | 11/1993 | Davis | E02B 11/00 405/36 |
| 5,934,730 | A * | 8/1999 | Yagishita | B60J 5/0451 280/751 |
| 6,474,721 | B2 * | 11/2002 | Nishikawa | B60J 5/0416 296/146.6 |
| 7,947,356 | B2 * | 5/2011 | Hirata | B29C 44/38 297/228.12 |

FOREIGN PATENT DOCUMENTS

| | | |
|---|---|---|
| JP | A-9-201841 | 8/1997 |
| JP | A-2001-293758 | 10/2001 |
| JP | A-2007-160787 | 6/2007 |
| JP | A-2009-90602 | 4/2009 |

* cited by examiner

RESIN VEHICLE PART MANUFACTURING METHOD AND RESIN VEHICLE PART

CROSS-REFERENCE TO RELATED APPLICATIONS

This is a U.S. national phase application based on the PCT International Patent Application No. PCT/JP2013/084799 filed on Dec. 26, 2013, and claiming the priority of Japanese Patent Application No. 2013-004421 filed Jan. 15, 2013, the entire contents of which are herewith incorporated by reference.

TECHNICAL FIELD

The present invention relates to a method for manufacturing a resin vehicle part to be used as an interior/exterior component of a vehicle and the resin vehicle part. In particular, the present invention relates to a method for manufacturing a resin vehicle part configured such that a reinforcing rib standing on a back surface of a panel body has a thin-walled base end portion, and the resin vehicle part.

BACKGROUND ART

In general, a resin vehicle part to be used as interior/exterior component (e.g., a bumper, a quarter trim, etc.) is provided with a panel body having a front surface including a design surface, the appearance of which is regarded as important in design, and a reinforcing rib provided standing on a back surface of the panel body. This resin vehicle part is manufactured by an injection molding method.

If the panel body is designed to be thinner in wall thickness in order to reduce the weight of the resin vehicle part, the front surface of a portion of the panel body, on which the reinforcing rib will be provided in an upright or standing manner, is apt to cause shrinkage strain associated with cooling of molten resin during injection molding. In particular, the surface of a portion of the panel body with a smaller sectional curvature is low in surface rigidity, so that large shrinkage strain (sink) occurs. Accordingly, there has been studied a technique related to thinning of a base end portion of a reinforcing rib in order to reduce sink in the front surface of the thinned panel body.

For instance, Patent Document 1 discloses a ribbed housing which is an injection-molded part including a cover member (corresponding to the panel body) having a front surface desired to provide appropriate appearance quality and a back surface formed with a rib, wherein the rib of a ribbed housing panel is continuously formed with a thin portion having a predetermined length and a thinner thickness in a direction away from the cover member and a thick portion having a larger thickness than the thin portion. The thickness of the thin portion is thinner in thickness than the cover member. Patent Document 1 describes that this ribbed housing panel in which the thickness of the thin portion is thinner in thickness than the cover member can prevent the generation of sink in the front surface of the cover member and the thick portion provided continuous with the thin portion can ensure the strength of the rib in supporting the cover member.

Furthermore, Patent Document 1 also discloses a configuration that a reinforcing rib is provided to extend from the cover member to the rib thick portion across the rib thin portion and teaches that the reinforcing rib can enhance the strength of the thin portion, thus increasing the strength of the rib itself.

RELATED ART DOCUMENTS

Patent Documents

Patent Document 1: Japanese patent application publication No. 5 (1993)-50474

SUMMARY OF INVENTION

Problems to be Solved by the Invention

However, in the technique of Patent Document 1, as shown in FIG. 18, an injection molding die 200 is provided with a slide piece 210 for forming a thin portion 121 of a rib 120. This injection molding die 200 is configured to move the slide piece 210 in an arrow-P direction to allow demolding of an injection-molded part 100 after injection molding. Accordingly, before the injection-molded part 100 is demolded after injection molding, when molten resin filled in a cavity of the injection molding die cools and shrinks in volume, a thick portion 122 of the rib 120 comes into contact with a protrusion 211 of the slide piece 210 and thus a pulling force (tensile force) acts on a cover member 110 in an arrow-K direction, leading to a problem with the generation of sink or sink mark 111 in the front surface of the cover member 110.

Furthermore, the above pulling force also acts on the thin portion 121 of the rib 120, resulting in a problem that the thin portion 121 low in strength may be broken or fractured. To avoid this, when a reinforcing rib 123 is provided to extend from the cover member 110 to the thick portion 122 of the rib 120 across the thin portion 121 of the rib 120 as disclosed in Patent Document 1, the strength of the thin portion 121 is increased, whereas the range and the size of the sink 111 generated in the front surface of the cover member 110 may further increase.

Therefore it is difficult to prevent the generation of the sink 111 in the front surface of the cover member 110 formed to be thin in wall thickness and ensure the strength of the thin portion 121 of the rib 120 by the technique in Patent Document 1.

The present invention has been made to solve the above problems and has a purpose to provide a resin vehicle part manufacturing method capable of reducing sink and others in a front surface of a panel body by a simple structure to achieve thin wall thickness and high rigidity of the panel body and the reinforcing rib, and a resin vehicle part.

Means of Solving the Problems (1) To achieve the above purpose, one aspect of the invention provides a method for manufacturing a resin vehicle part provided with a panel body having a front surface including a design surface and a stepped reinforcing rib formed standing on a back surface of the panel body, the stepped reinforcing rib having a base end portion with a thickness thinner than a leading end portion, wherein an injection molding die for the resin vehicle part includes a movable slide piece to form the reinforcing rib, after molten resin is filled in the injection molding die, the slide piece is pushed by the leading end portion of the stepped reinforcing rib and moved in a direction to come close to the panel body when the stepped reinforcing rib shrinks in a height direction.

(2) In the resin vehicle part manufacturing method set forth in (1), preferably, the slide piece is movably connected to a lifting part of a lifting device provided in the injection molding die through an elastic element that urges the slide piece in a direction to come close to the lifting part, and the slide piece is moved upward together with the lifting part during product demolding.

(3) In the resin vehicle part manufacturing method set forth in (1) or (2), preferably, the injection molding die includes an insert die in which the slide piece is slidably fitted, and the method includes filling molten resin in a cavity provided in a gap between the slide piece and the insert die to form the stepped reinforcing rib.

(4) In the resin vehicle part manufacturing method set forth in (3), preferably, a groove-shaped cavity is provided in a shoulder of the slide piece or the insert die, the groove-shaped cavity being communicated with the cavity for forming the stepped reinforcing rib, and the method includes filling molten resin in the groove-shaped cavity to form a triangular reinforcing rib for reinforcing only a root of the base end portion of the stepped reinforcing rib. Herein, the term "shoulder portion" represents a ridge portion formed in a position corresponding to the root of the base end portion of the stepped reinforcing rib in the slide piece or the insert die.

(5) To achieve the above purpose, another aspect of the invention provides a method for manufacturing a resin vehicle part provided with a panel body having a front surface including a design surface and a stepped reinforcing rib formed standing on a back surface of the panel body, the reinforcing rib having a base end portion with a thickness thinner than a leading end portion, wherein an injection molding die for the resin vehicle part includes a first slide piece for forming one stepped reinforcing rib so that the first slide piece is movable in a demolding direction and a second slide piece for forming the other stepped reinforcing rib so that the second slide piece is movable in a direction different from the demolding direction, after molten resin is filled in the injection molding die, the first slide piece and the second slide piece are pushed by the leading end portions of the stepped reinforcing ribs in a direction to come close to the panel body when the stepped reinforcing ribs shrink in a height direction.

(6) In the resin vehicle part manufacturing method set forth in (5), preferably, the injection molding die includes lock pins for fixing the first slide piece and the second slide piece in respective positions, the method includes locking the lock pins in the first slide piece and the second slide piece before the molten resin is filled in the injection molding die, and releasing the lock pins from the first slide piece and the second slide piece after the molten resin is filled in the injection molding die.

(7) In the resin vehicle part manufacturing method set forth in (5) or (6), preferably, the injection molding die includes a second insert die in which the second slide piece is slidably fitted, the method includes filling molten resin in a cavity provided in a gap between the second slide piece and the second insert die to form the stepped reinforcing rib.

(8) In the resin vehicle part manufacturing method set forth in (7), preferably, the method includes moving the second insert die in a direction to expand a cavity of the stepped reinforcing rib formed in the gap between the second slide piece and the second insert die during product demolding.

In the resin vehicle part manufacturing method set forth in (7) or (8), preferably, the cavity for the stepped reinforcing rib formed in the gap between the second slide piece and the second insert die is formed linearly in almost the same direction as the demolding direction of the injection molding die.

(10) To achieve the above purpose, still another aspect of the invention provides a resin vehicle part manufactured by the resin vehicle part manufacturing method set forth in any one of (1) to (9), a resin vehicle part manufactured by the resin vehicle part manufacturing method according to any one of claims 1 to 9, wherein the stepped reinforcing rib includes a plurality of stepped reinforcing ribs each provided to extend linearly on the back surface of the panel body, the stepped reinforcing ribs being arranged in nearly parallel with each other and spaced from each other.

(11) In the resin vehicle part set forth in (10), preferably, the stepped reinforcing rib is provided with a triangular reinforcing rib connecting the back surface of the panel body and a root of the base end portion of the stepped reinforcing rib.

EFFECTS Of THE INVENTION

According to the present invention, it is possible to provide a resin vehicle part manufacturing method capable of reducing sink and others in a front surface of a panel body by a simple die structure to achieve thin wall thickness and high rigid of a panel body and a reinforcing rib, and a resin vehicle part.

MODE FOR CARRYING OUT THE INVENTION

<<First Embodiment>>

A detailed description of a first embodiment of embodying a resin vehicle part manufacturing method and a resin vehicle part according to the present invention will now be given below referring to the accompanying drawings.

<Structure of Resin Vehicle Part>

Figure 1:
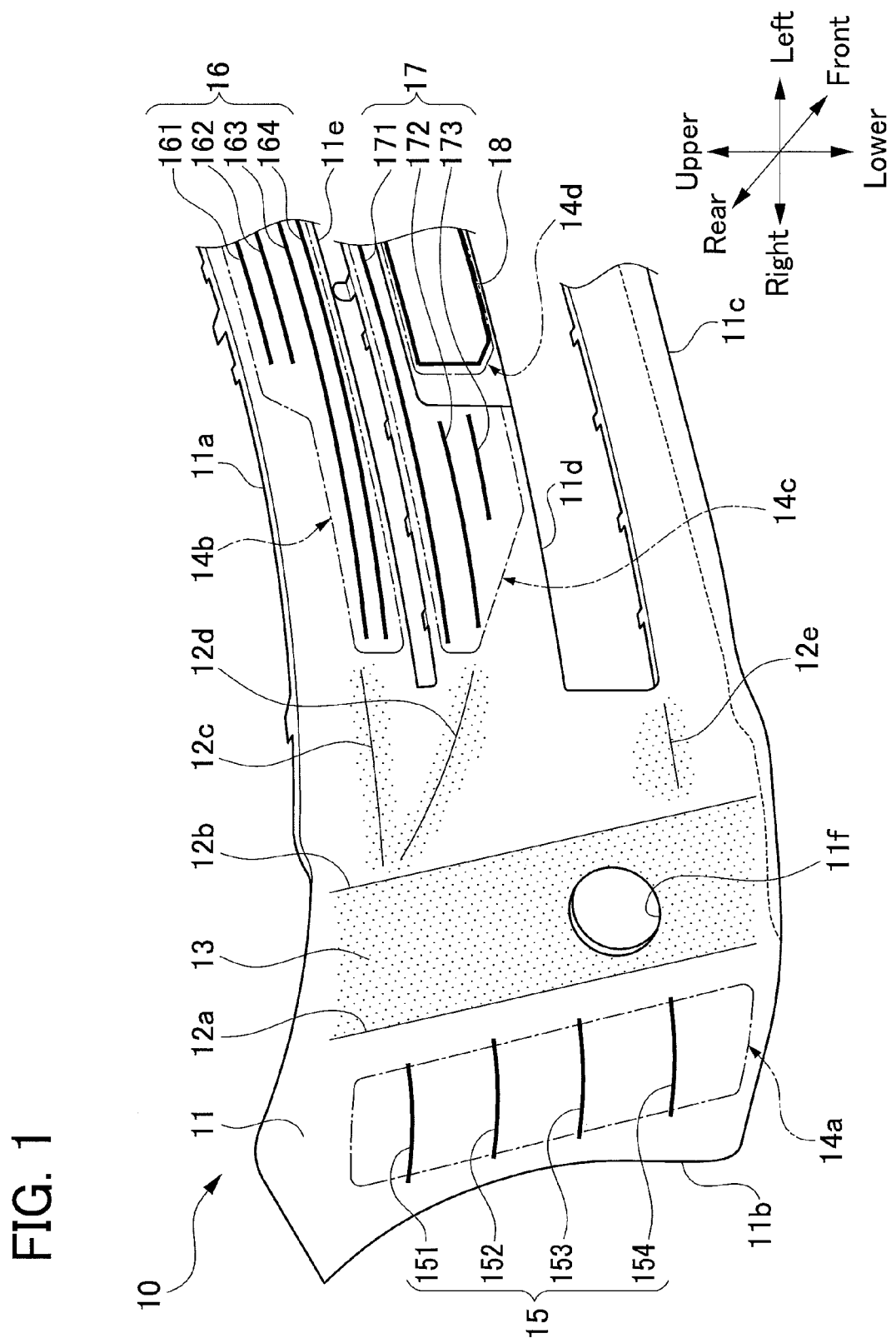
FIG. 1 is a schematic perspective view of a resin vehicle part (a front bumper) in a first embodiment according to the present invention.
Figure 2:
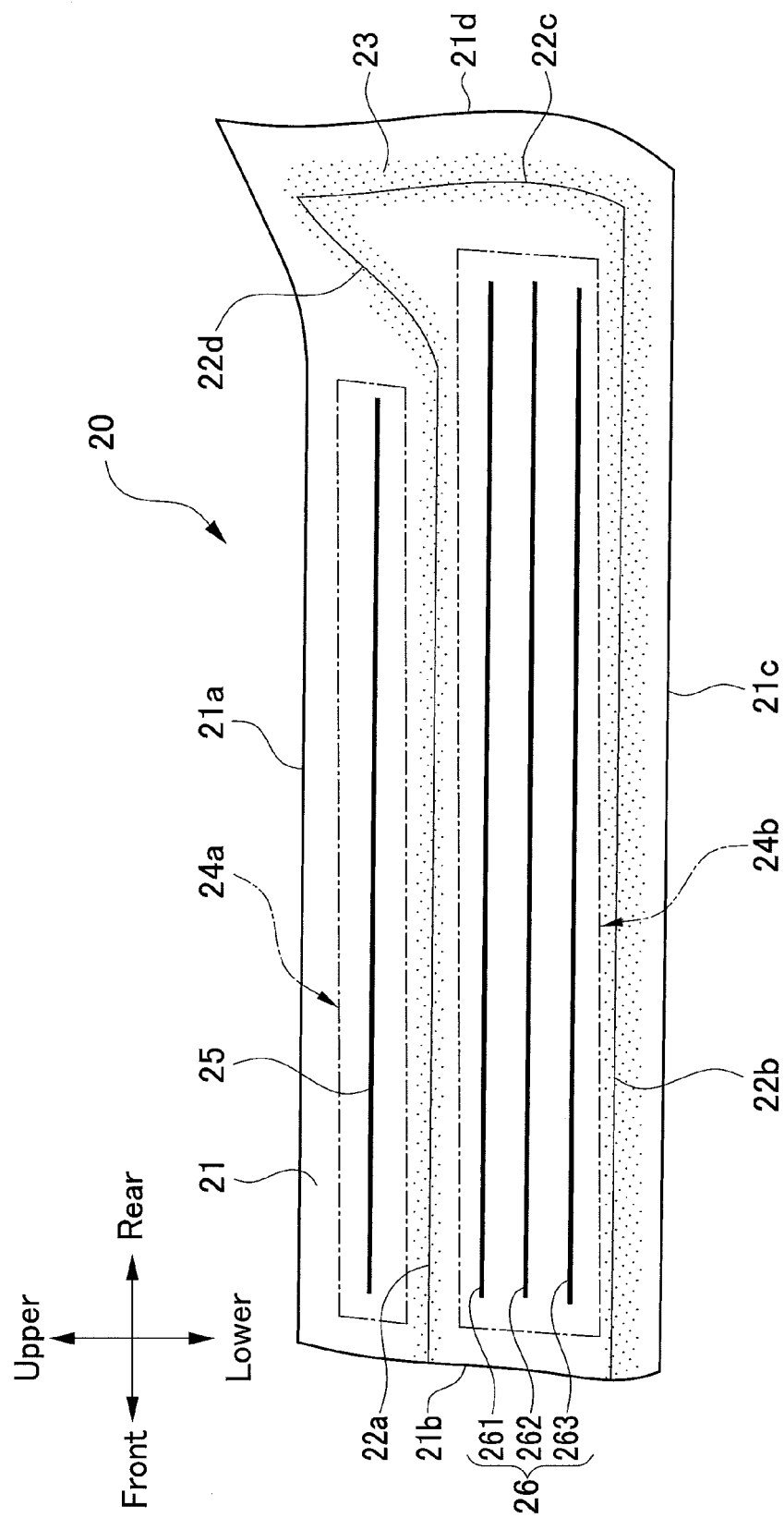
FIG. 2 is a schematic perspective view of a resin vehicle part (a side mud guard) in the first embodiment according to the present invention.
Figure 3:
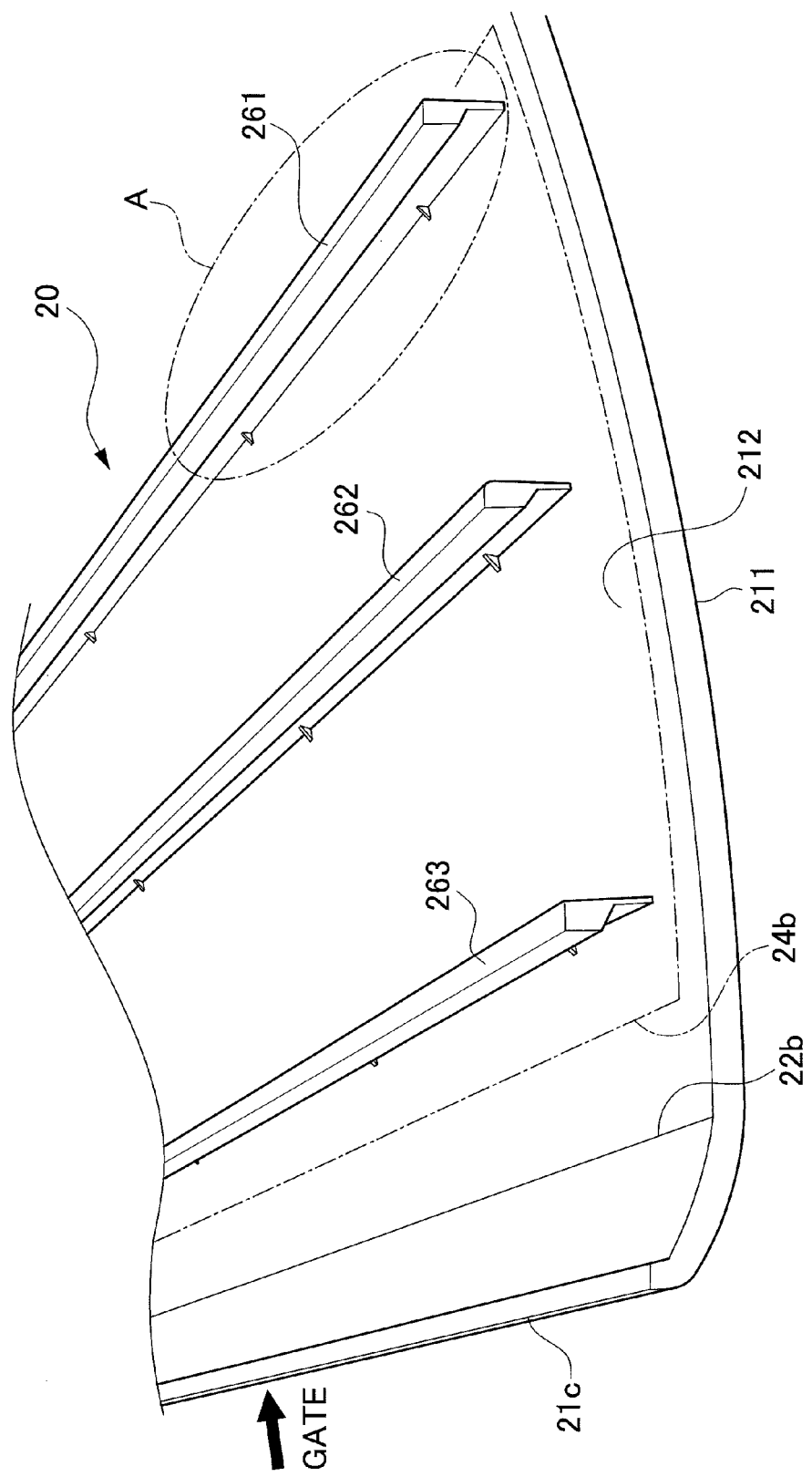
FIG. 3 is a partial perspective view of the resin vehicle part (the side mud guard) shown in FIG. 2, seen from a back surface side.
Figure 4:
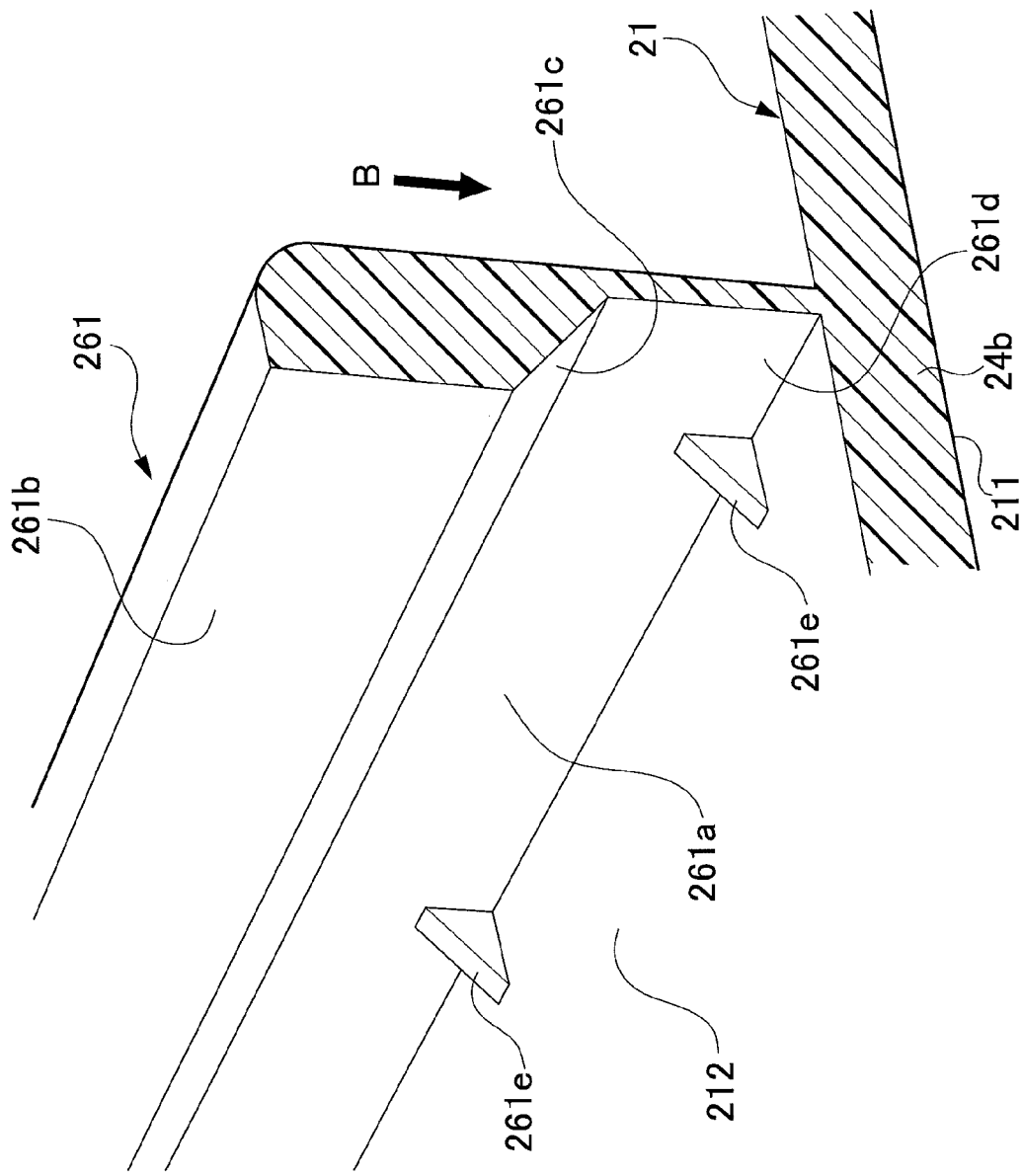
FIG. 4 is a perspective view of a section A in FIG. 3.
Figure 5:
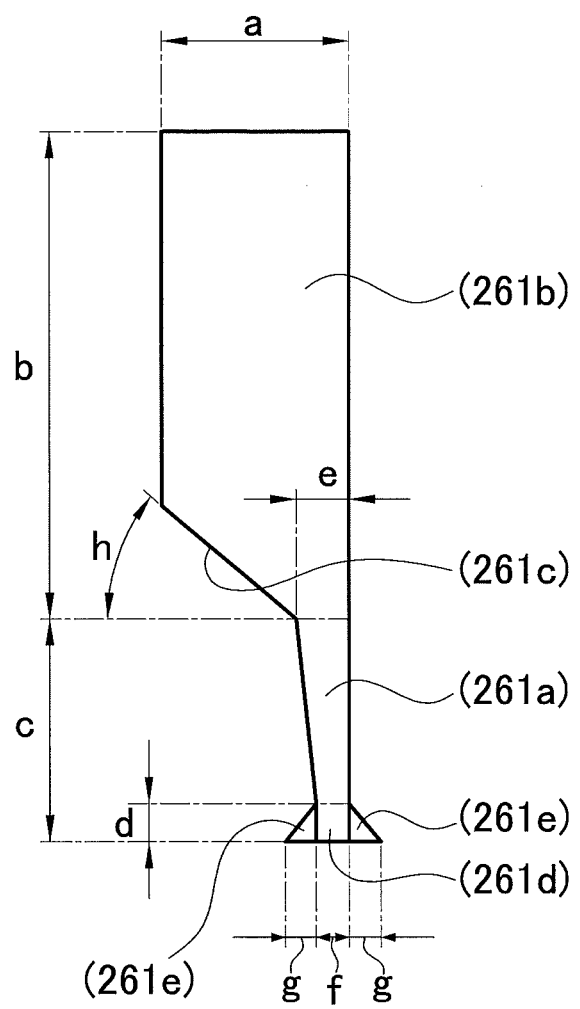
FIG. 5 is a detailed cross sectional view of a stepped reinforcing rib shown in FIG. 4.
Figure 6:
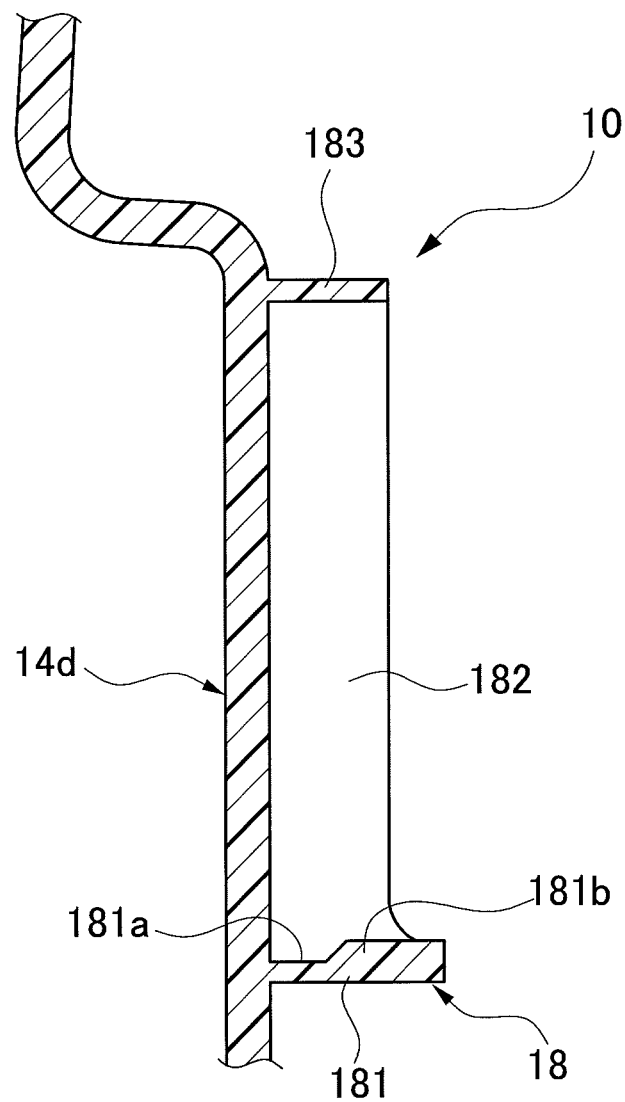
FIG. 6 is a cross sectional view of a license plate attaching part shown in FIG. 1.

A resin vehicle part (a resin component for vehicle) in the first embodiment according to the present invention will be first explained for example in the form of a front bumper and a side mud guard of a vehicle. FIG. 1 is a schematic perspective view of the resin vehicle part (the front bumper) in the first embodiment according to the present invention. FIG. 2 is a schematic perspective view of the resin vehicle part (the side mud guard) in the first embodiment according to the present invention. FIG. 3 is a partial perspective view of the resin vehicle part (the side mud guard) shown in FIG. 2, seen from its back surface side. FIG. 4 is a perspective view of a section A shown in FIG. 3. FIG. 5 is a detailed cross sectional view of a stepped reinforcing rib shown in FIG. 4. FIG. 6 is a cross sectional view of a license plate attaching part shown in FIG. 1.

(Example of Front Bumper)

As shown in FIG. 1, a resin vehicle part (a front bumper) 10 is an exterior part extending in a right-left direction in a front lower end area of a vehicle. FIG. 1 illustrates a right half of the front bumper 10 having right-left symmetry. Arrowed directions given in FIG. 1 indicate right, left, upper, lower, rear, and front sides of the front bumper 10 when mounted in a vehicle.

The front bumper 10 has a nearly angular U-shaped in transverse section (in a cross section along the right-left direction) and is provided with a panel body 11 having front surface including a design surface on a vehicle exterior side, the appearance of which is regarded as important in design, and stepped reinforcing ribs (first ribs 15, second ribs 16, and third ribs 17) each provided in upright, or standing, manner on a back surface of the panel body 11. These stepped reinforcing ribs 15 to 17 are groups each including a plurality of reinforcing ribs each of which has a shape that a base end portion is thinner in thickness than a leading end portion and extends linearly. The reinforcing ribs in each group are arranged in nearly parallel with and spaced from each other. The details thereof will be mentioned later.

The panel body 11 has an outer peripheral edge defined by an upper parting portion 11a, right and left parting portions 11b, and a lower parting portion 11c, and is formed with a lower opening 11d for air intake and an upper opening 11e, which will be located in a front surface of a vehicle. At each end of the upper parting portion 11a, right and left parting portions 11b, lower parting portion 11c, lower opening 11d, and upper opening 11e, a short flange is formed, providing ridges of the panel body 11. In the front surface of the panel body 11, ridges 12a to 12e for design are formed of character lines. On the right and left sides of the panel body 11, corner portions 13 are formed to be curved from a vehicle front surface in a front-rear direction. Portions near the ridges 12a to 12e and the corner portions 13 (indicated with dot hatching) are high in surface rigidity. Each corner portion 13 is formed with a lamp attaching hole 11f. Furthermore, normal portions 14a to 14c (regions surrounded by imaginary lines) are formed between the ridges of the parting portions 11a to 11c or the lower opening 11d and the upper opening 11e or the ridges 12a to 12e for design excepting the corner portions 13. The normal portions 14a to 14c are small in sectional curvature and nearly flat. These normal portions 14a to 14c (the regions surrounded by the imaginary lines) are lower in surface rigidity than the corner portions and the ridges.

On the back surface of each normal portion 14a to 14c having low surface rigidity, the stepped reinforcing ribs (the first ribs 15, second ribs 16, and third ribs 17) are provided in a standing form. These stepped reinforcing ribs 15 to 17 are provided to extend in nearly parallel with and at a distance from the ridges of the panel body 11. In FIG. 1, for convenience, the stepped reinforcing ribs 15 to 17 are illustrated by thick solid lines.

To be concrete, the first ribs 15 are provided to extend in nearly parallel with and spaced from the lower parting portion 11c. The first ribs 15 include four reinforcing ribs 151, 512, 153, and 154 each extending in the front-rear direction. The stepped reinforcing ribs 151 to 154 are each formed in a right-left symmetric position. The stepped reinforcing ribs 151 to 154 extend in nearly parallel with and at a nearly equal distance from each other.

The second ribs 16 are provided to extend in nearly parallel with and spaced from the ridge of the upper opening 11e. The second ribs 16 include four stepped reinforcing ribs 161, 162, 163, and 164 each extending in the right-left direction. The stepped reinforcing ribs 161 to 164 extend at a nearly equal distance from each other; however, the upper stepped reinforcing ribs 161 and 162 are different in length from the lower stepped reinforcing ribs 163 and 164 in conformity to the shape of the normal portion 14b.

The third ribs 17 are provided to extend in nearly parallel with and spaced from the ridge of a lower end of the upper opening 11e. The third ribs 17 include five stepped reinforcing ribs 171, 172, and 173 extending in the right-left direction. The stepped reinforcing ribs 171 to 173 extend at a nearly uniform distance from each other; however, the reinforcing ribs 171 to 173 are different in length from each other in conformity to the shape of the normal portion 14c.

(Example of Side Mud Guard)

As shown in FIGS. 2 and 3, a resin vehicle part (a side mud guard) 20 is an exterior part extending in the front-rear direction under a side surface of a vehicle. Arrowed directions given in FIG. 2 indicate upper, lower, front, and rear sides of the side mud guard 20 when mounted in a vehicle.

The side mud guard 20 has a nearly rectangular shape in side view and is provided with a panel body 21 having a front surface 211 including a design surface whose appearance is regarded as important in design, and stepped reinforcing ribs (a fifth rib 25 and sixth ribs 26) each provided in upright or standing manner on a back surface 212 of the panel body 21. The stepped reinforcing ribs 25 and 26 are groups each including a plurality of reinforcing ribs each of which has a shape that a base end portion is thinner in thickness than a leading end portion and extends linearly. The reinforcing ribs in each group are arranged in nearly parallel with and spaced from each other. The details thereof will be mentioned later.

The panel body 21 has an outer peripheral edge defined by an upper parting portion 21a, a front parting portion 21b, a lower parting portion 21c, and a rear parting portion 21d. At each end of the upper parting portion 21a, front parting portion 21b, lower parting portion 21c, and rear parting portion 21d, a short flange is formed, providing ridges of the panel body 21. In the front surface of the panel body 21, ridges 22a to 22d for design are formed of character lines. Portions near the ridges 22a to 22d (indicated with dot hatching) are high in surface rigidity. Between the ridges of the parting portions 21*a* to 21*d*, or the ridges 22*a* to 22*d*, normal portions 24*a* and 24*b* (regions surrounded by imaginary lines) having small sectional curvature and nearly flat are formed. These normal portions 24*a* and 24*b* (the regions surrounded by the imaginary lines) are lower in surface rigidity than the ridges.

On the back surface 212 of each normal portion 24*a* and 24*b* having low surface rigidity, the stepped reinforcing ribs (the fifth rib 25 and the sixth ribs 26) are provided in a standing from as shown in FIGS. 2 and 3. The stepped reinforcing ribs 25 and 26 are provided to extend linearly in nearly parallel with and at a distance from the ridges of the panel body 21. In FIG. 2, for convenience, the stepped reinforcing ribs 25 and 26 are illustrated by thick solid lines.

To be concrete, the fifth rib 25 is a single rib provided to extend in nearly parallel with and spaced from the ridge 22*a* for design formed of a character line. The sixth ribs 26 are provided to extend in nearly parallel with and spaced from the ridges 22*a* and 22*b* for design each formed of a character line. The sixth ribs 26 include three stepped reinforcing ribs 261, 262, and 263 each extending in the front-rear direction. The stepped reinforcing ribs 261 to 263 are provided to extend in nearly parallel with and at a nearly equal distance from each other. These reinforcing ribs 261 to 263 are equal in length. A gate through which molten resin is to be injected is provided on the side of the lower parting portion 21*c*.

(Detailed Structure of Stepped Reinforcing Rib)

The detailed structures are common between the stepped reinforcing ribs 15 to 17 of the front bumper 10 and the stepped reinforcing ribs 25 and 26 of the side mud guard 20 and thus the sixth rib 26 (the section A) will be explained as an example thereof.

As shown in FIGS. 4 and 5, the stepped reinforcing rib 261 is provided standing in a vertical direction (an arrow-B direction) on the back surface 212 of the panel body 21. The stepped reinforcing rib 261 is provided with a base end portion 261*a* formed thinner in thickness than the normal portion 24*b* and a leading end portion 261*b* formed thicker in thickness than the base end portion 261*a*.

The thickness of the base end portion 261*a* is preferably determined in a range of about ¼ to ⅙ of the thickness of the normal portion 24*b*. When the thickness of the base end portion 261*a* is set to about ¼ to ⅙ of the thickness of the normal portion 24*b*, it was experimentally revealed that generation of sink on the front surface 211 of the panel body 21 could be greatly reduced. For instance, when the thickness of the normal portion 24*b* is 1.8 to 2.0 mm, the thicknesses f and e of the base end portion 261*a* are preferably about 0.3 to 0.5 mm. Further preferably, the thickness f of a root 261*d* of the base end portion 261*a* is thinner than the thickness e of a connecting portion with the leading end portion 261*b*. This is because the root formed with more thinner thickness f can further reduce sink of the normal portion 24*b*. In this case, side walls of the base end portion 261*a* may be formed in a tapered shape widening linearly upward from a narrow root 261*d* or may be formed in a tapered shape widening in a curve upward from the narrow root 261*d*.

The leading end portion 261*b* is formed by directly extending one side wall of the base end portion 261*a* and protruding from the other side wall of the base end portion 261*a* in a direction to increase in thickness. Under the leading end portion 261*b* formed to protrude (on the base end portion side), an inclined surface 261*c* is formed. The thickness a of the leading end portion 261*b* is appropriately set according to the surface rigidity of the normal portion 24*b*; preferably, it is nearly equal to the thickness of the normal portion 24*b*.

The height c of the base end portion 261*a* is about 2 to 3 mm. The height b of the leading end portion 261*b* is preferably about 4 to 5 mm. An inclination angle of the inclined surface 261*c* with respect to a horizontal direction is preferably about 45°.

The stepped reinforcing rib 261 is formed with triangular reinforcing ribs 261*e* each connecting the back surface 212 of the panel body 21 and the root 261*d* of the base end portion 261*a*. The triangular reinforcing ribs 261*e* are formed more than one at predetermined intervals in an extending direction of the stepped reinforcing rib 261. The bottom length g and the height d of each triangular reinforcing rib 261*e* are preferably about ⅓ to ⅙ of the height c of the base end portion 261*a*. This is to reinforce only the root 261*d* of the base end portion 261*a* of the stepped reinforcing rib 261. For instance, the bottom length g and the height d of each triangular reinforcing rib 261*e* are preferably about 0.4 to 0.6 mm. The thickness of each triangular reinforcing rib 261*e* is preferably equivalent to the thickness of the base end portion 261*a*. This is to reduce the generation of sink in the front surface of the panel body 21.

(Structure of Stepped Rib on License Plate Attaching Surface)

Next, the structure of a stepped rib 181 on a license plate attaching surface of the front bumper 10 will be explained.

As shown in FIGS. 1 and 6, the fourth rib 18 has a nearly rectangular frame shape including the stepped rib 181 and normal straight stepless ribs 182 and 183 continuously extending on right, left, and upper sides of the stepped rib 181. The height of each straight rib 182 and 183 is lower than the height of the stepped rib 181. The thickness of each straight rib 182 and 183 is equivalent to the thickness of the base end portion 181*a* of the stepped rib 181. The thickness of the leading end portion 181*b* of the stepped rib 181 is equivalent to the thickness of the normal portion 14*d*. The stepped rib 181 is reinforced by the straight ribs 182 and 183 and thus a triangular reinforcing rib can be omitted. The stepped rib 181 may also be formed independently in a separate form from the straight ribs 182 and 183. A cross sectional structure of the stepped rib 181 is the same as that of the stepped reinforcing rib 261 described above and therefore the details thereof are omitted.

<Manufacturing Method of Resin Vehicle Part>

Figure 7:
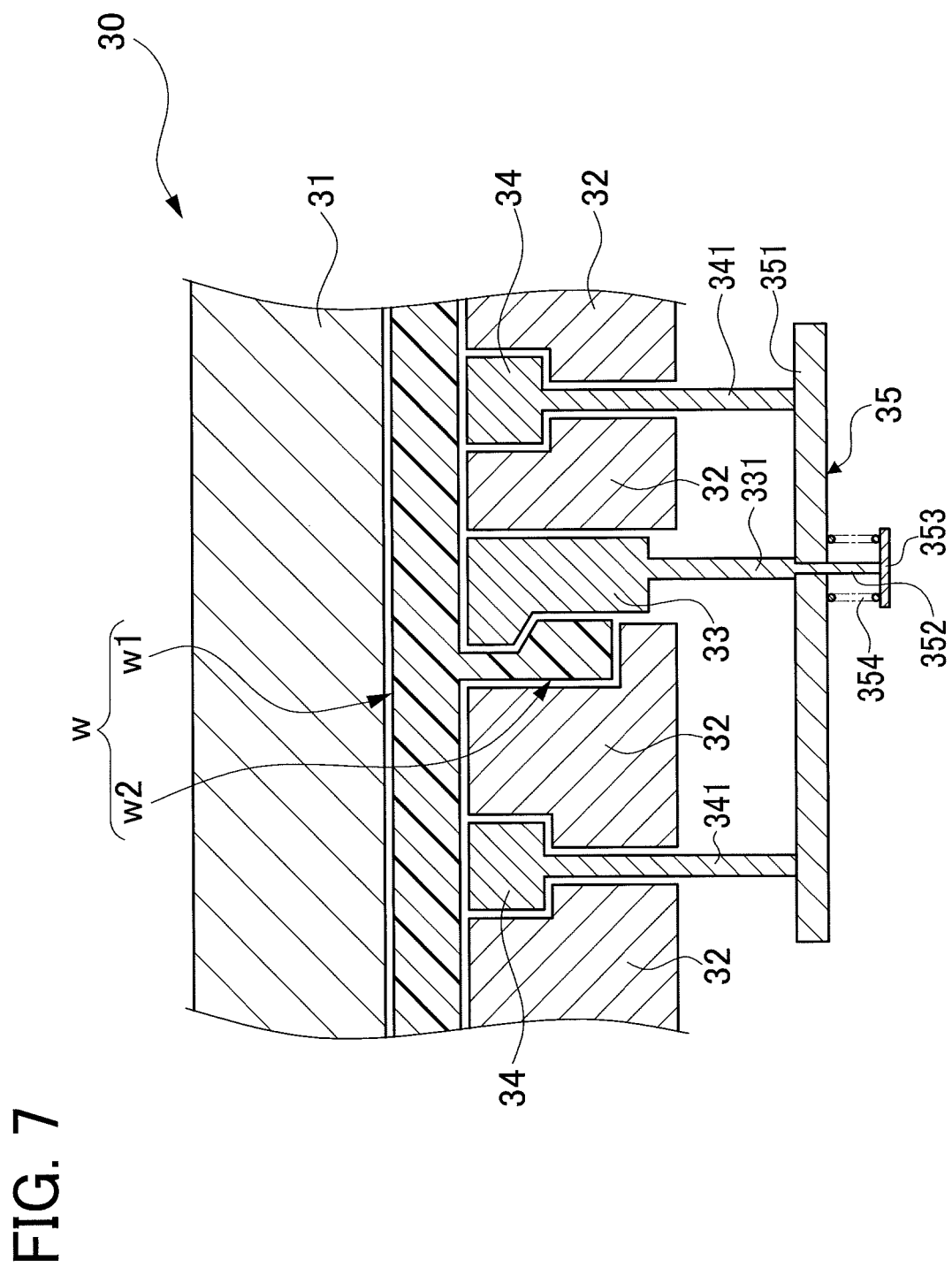
FIG. 7 is a partial cross sectional view of an injection molding die for forming the resin vehicle part shown in FIG. 1 or 2.
Figure 8:
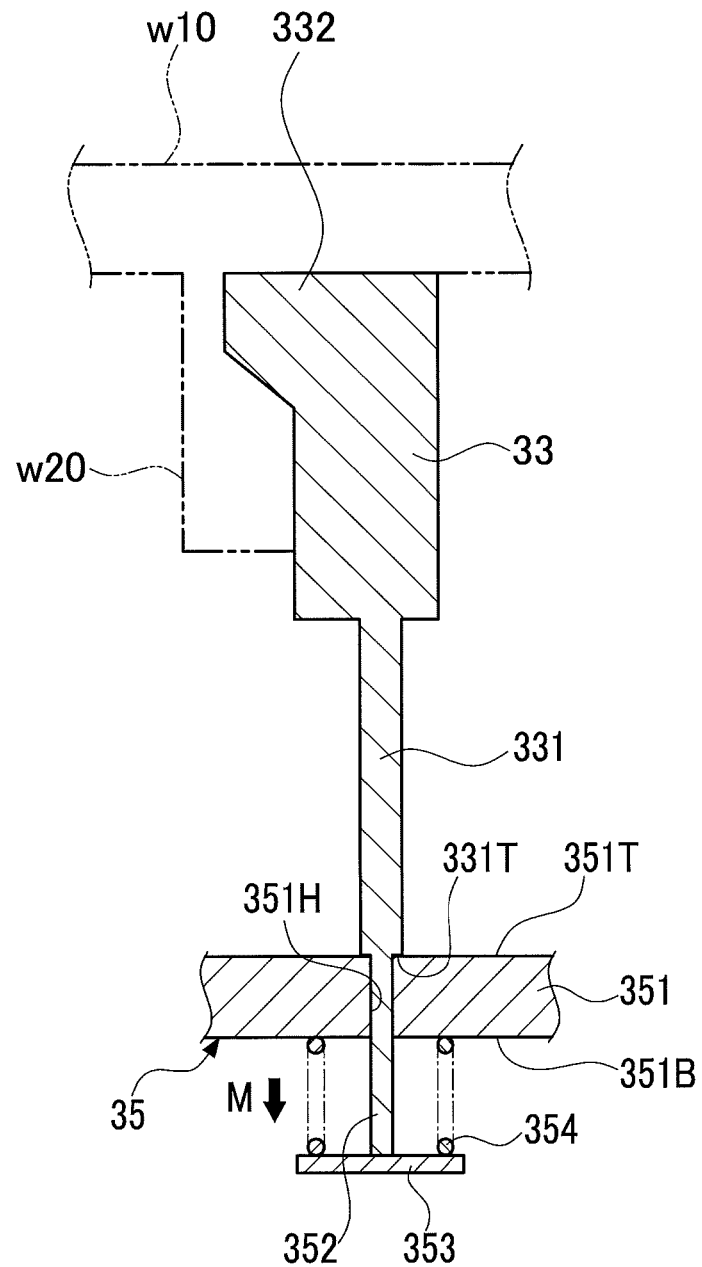
FIG. 8 is a schematic cross sectional view of a slide piece of the injection molding die shown in FIG. 7.
Figure 9:
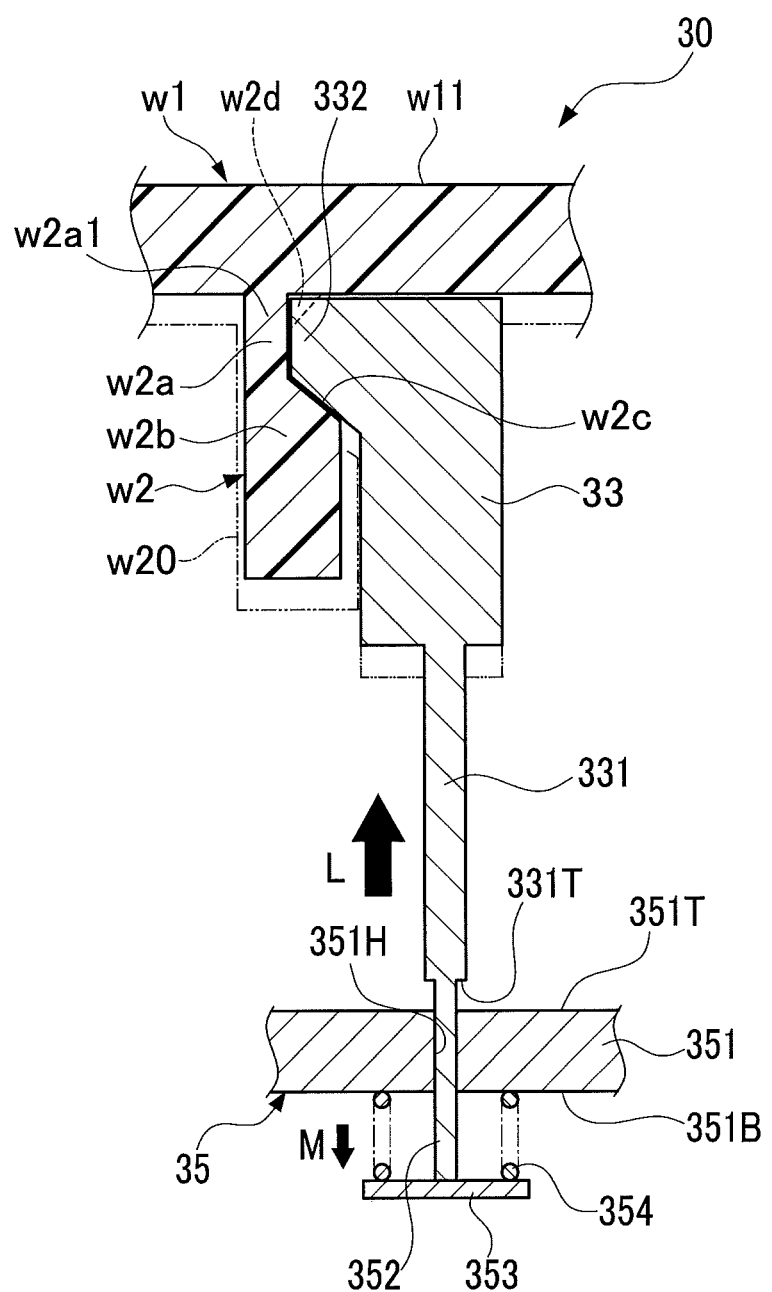
FIG. 9 is an explanatory view of operations of the slide piece shown in FIG. 8.
Figure 10:
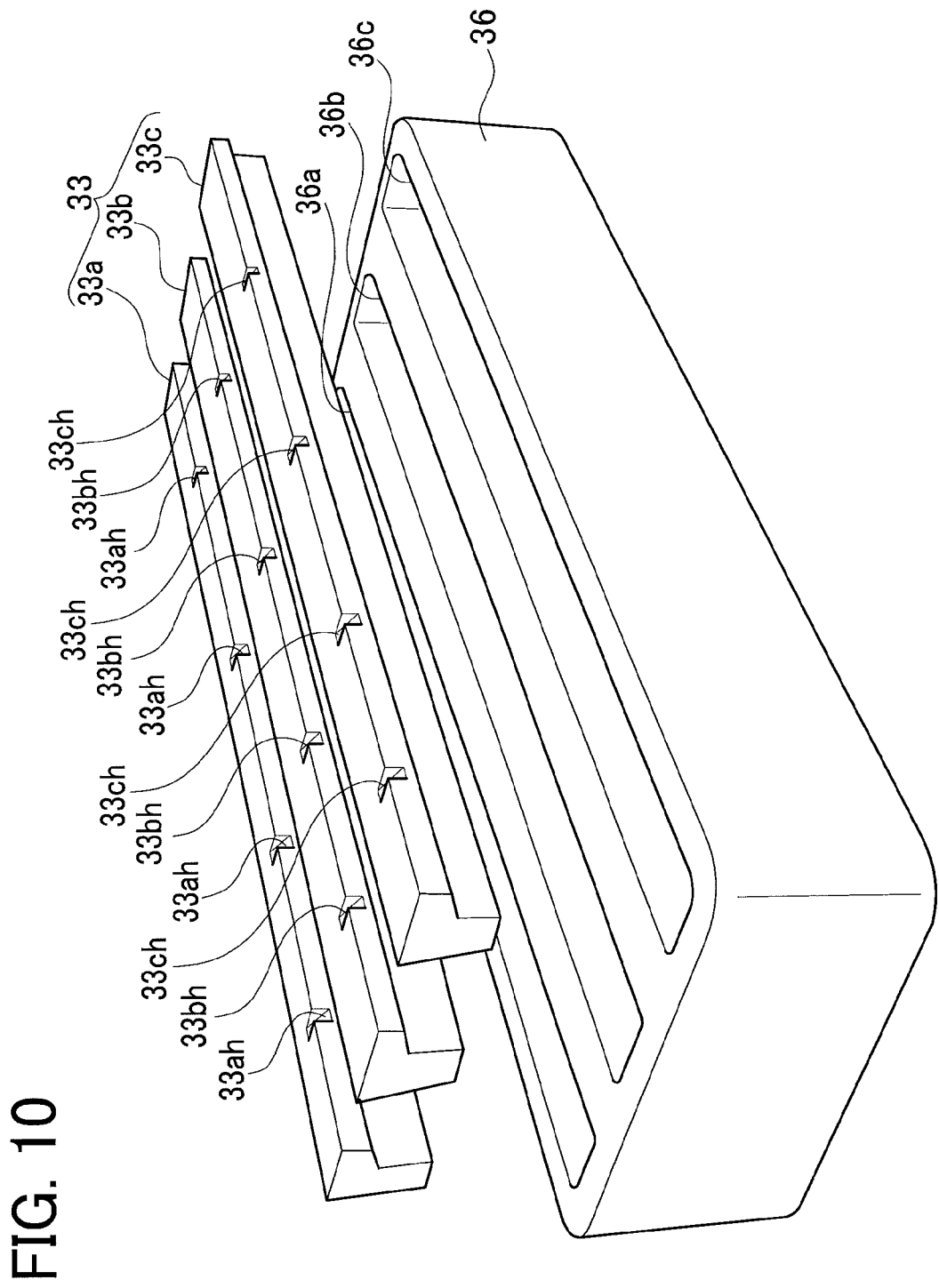
FIG. 10 is a partial perspective view of the injection molding die shown in FIG. 7.
Figure 11:
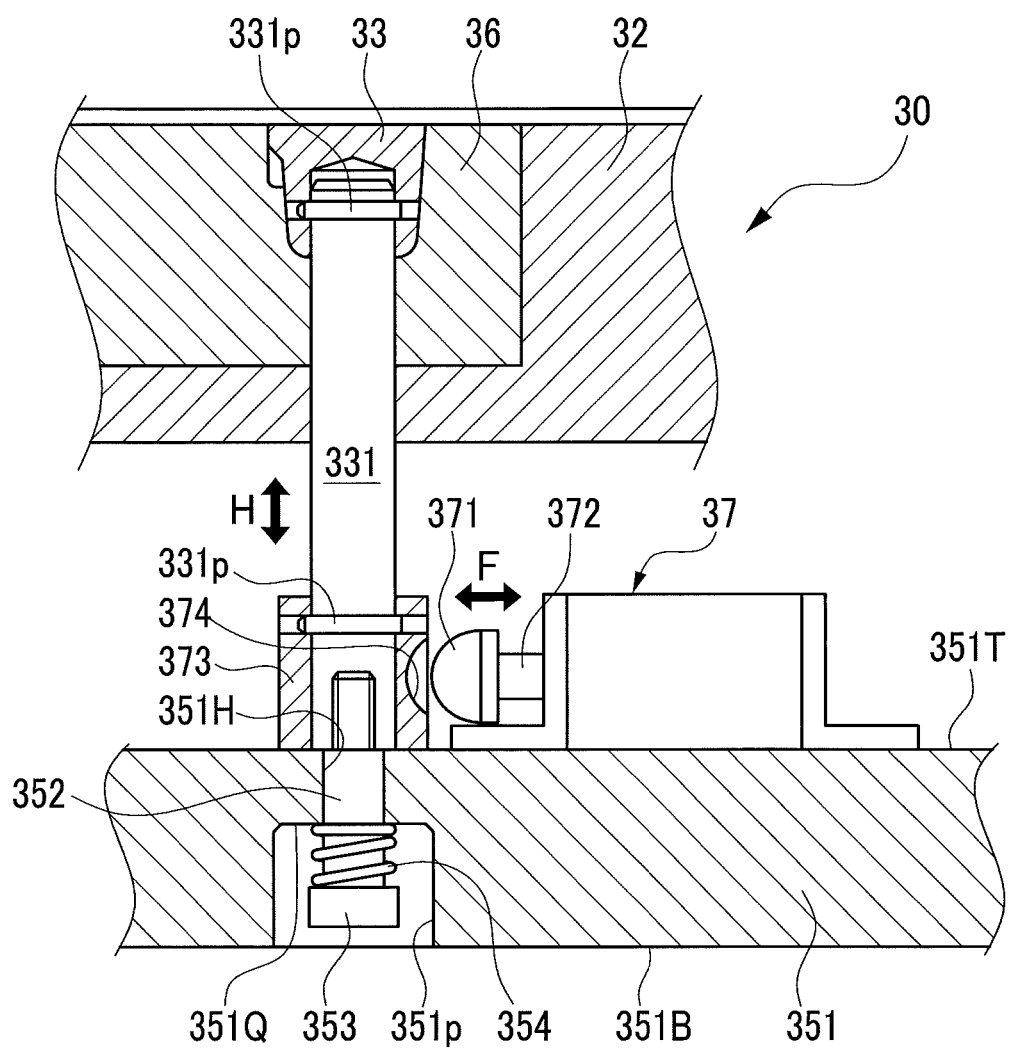
FIG. 11 is a detailed cross sectional view of a centering device for the slide piece in the injection molding die shown in FIG. 7.

Next, a method for manufacturing a resin vehicle part by an injection molding method will be explained. The injection molding method itself for resin vehicle part is a well-known technique. Therefore, the following explanation is given with a focus on the features of the present invention, that is, a method capable of reducing the generation of sink and others in a front surface of a panel body when molten resin forming a stepped reinforcing rib cools and shrinks. FIG. 7 is a partial cross sectional view of an injection molding die for forming the resin vehicle part shown in FIG. 1 or 2. FIG. 8 is a schematic cross sectional view of a slide piece of the injection molding die shown in FIG. 7. FIG. 9 is an explanatory view of operations of the slide piece shown in FIG. 8. FIG. 10 is a partial perspective view of the injection molding die shown in FIG. 7. FIG. 11 is a detailed cross sectional view of a centering device for the slide piece in an injection molding die shown in FIG. 7.

As shown in FIGS. 7, 8, and 9, an injection molding die 30 for injection molding a resin vehicle part is provided with a lifting device 35 used to demold or release an injection-molded part w from a fixed die 31 and a movable die 32. The injection-molded part w includes a panel body w1 and a stepped reinforcing rib w2. The movable die 32 internally contains a slide piece 33 for forming the stepped reinforcing rib w2 having a negative angular shape and panel receiving members 34 which will contact with the back surface of the panel body w1. The slide piece 33 is movably coupled with a lifting plate 351 of the lifting device 35 through a spring member 354 (an elastic body). At a lower end of the slide piece 33, a coupling member is formed. The coupling member consists of a large-diameter connecting pin 331, a small-diameter connecting pin 352, and a plate-like spring receiving member 353. A lower end 331T of the large-diameter connecting pin 331 contacts with an upper end 351T of the lifting plate 351. The small-diameter connecting pin 352 is formed at the lower end 331T of the large-diameter connecting pin 331 and protrudes downward from a through hole 351H penetrating through the lifting plate 351. The spring receiving member 353 is fastened to a lower end of the small-diameter connecting pin 352. Between a lower end 351B of the lifting plate 351 and the spring receiving member 353, a spring member 354 is mounted. At a lower end of the panel receiving member 34, a connecting member 341 is formed. This connecting member 341 is fixed to the lifting plate 351.

At the time of demolding a product, when the lifting plate 351 of the lifting device 35 is moved upward in a demolding direction (an arrow-L direction), the slide piece 33 and the panel receiving member 34 are moved at the same time. Simultaneous movement of the slide piece 33 and the panel receiving member 34 enables the injection-molded part w to be uniformly demolded from the movable die 32. Herein, after the injection-molded part w is moved up to a position where the stepped reinforcing rib w2 goes out of the cavity of the movable die 32, a carrier device not shown carries and delivers the injection-molded part w in a direction away from the slide piece 33, thereby avoiding interference between a leading end portion w2b of the stepped reinforcing rib w2 and a protrusion 332 of the slide piece 33. Accordingly, the injection-molded part w can be readily demolded.

As shown in FIGS. 8 and 9, the slide piece 33 is movably connected with the lifting plate 351 of the lifting device 35 through the spring member 354. Thus, during shrinking action of the stepped reinforcing rib w2, the protrusion 332 of the slide piece 33 is pressed by the leading end portion w2b (herein, an inclined surface w2c) of the stepped reinforcing rib w2 and then moved in an arrow-L direction. Herein, the spring member 354 urges the slide piece 33 in a direction (an arrow-M direction) to come to close to the lifting plate 351. This urging force is set to a sufficiently small force as compared with a shrinkage force of molten resin filled in the cavities w10 and w20 of the injection molding die 30 at the time of cooling and shrinking in volume. Therefore, when the molten resin filled in the cavities w10 and w20 cools and shrinks in volume, the spring member 354 can be easily compressed.

Accordingly, the pulling force associated with shrinking action of the stepped reinforcing rib w2 hardly acts on a front surface w11 of the panel body w1, so that sink that may be generated in the front surface of the panel body w1 can be greatly reduced.

Since the above pulling force also hardly acts on the base end portion w2a of the stepped reinforcing rib w2, it is possible to greatly reduce a possibility that the base end portion w2a of the stepped reinforcing rib w2 fractures even when the thickness thereof is set thin.

The spring member 354 urges the slide piece 33 in the direction (the arrow-M direction) to come close to the lifting plate 351. Accordingly, when the molten resin is being filled in the cavity w10 for the panel body w1, the slide piece 33 does not protrude into the cavity w10 for the panel body w1. The lower end 331T of the large-diameter connecting pin 331 formed at the lower end of the slide piece 33 is in contact with the upper end 351T of the lifting plate 351. Accordingly, when the molten resin is being filled in the cavity w10 for the panel body w1, the slide piece 33 does not move downward nor expand the cavity w10 for the panel body w1.

Therefore, the slide piece 33 does not interfere with a flow of molten resin in the cavity w10 for the panel body w1. This can prevent the occurrence of molding defects such as welds and voids in the panel body w1.

<Structure of Slide Piece and Insert Die in Injection Molding Die>

The structure of the slide piece and the insert die in the injection molding die will be explained below. FIG. 10 is a partial perspective view of the injection molding die shown in FIG. 7. FIG. 11 is a detailed cross sectional view related to a centering device for the slide piece in the injection molding die shown in FIG. 7.

As shown in FIGS. 10 and 11, in an injection molding die 30, a rectangular insert die 36 is inserted in the movable die 32. The insert die 36 is formed with rectangular rib grooves 36a, 36b, and 36c located corresponding to the stepped reinforcing ribs w2 (see FIG. 9). In the rib grooves 36a to 36c, slide pieces 33a, 33b, and 33c are inserted to be movable up and down, each having a nearly L-shaped cross section and extending in a linear shape. In gaps between the rib grooves 36a to 36c formed in the insert die 36 and the slide pieces 33a to 33c, cavities w20 (see FIG. 9) for the stepped reinforcing ribs w2 are formed. Accordingly, the thickness of the base end portion w2a (see FIG. 9) can be set to be as very thin as about 0.3 to 0.5 mm. Adjusting the above gaps makes it easy to change the thickness of the stepped reinforcing ribs w2. In each slide piece 33a to 33c, a shoulder portion formed in a position corresponding to a root of the base end portion w2a of each stepped reinforcing rib w2 is provided with groove-shaped cavities 33ah, 33bh, and 33ch for triangular reinforcing ribs w2d (see FIG. 9) at predetermined intervals. As an alternative, the groove-shaped cavities may be provided in a shoulder portion of each of the rib grooves 36a, 36b, and 36c formed in the insert die 36 at a position corresponding to the root of the base end portion w2a of each stepped reinforcing rib w2.

As shown in FIG. 11, the injection molding die 30 can be provided with a centering device 37 for the slide piece 33. This centering device 37 includes a cylinder body 372 having a semispherical centering block 371 fixed at a rod leading end, and a cylindrical body 373 formed with a recessed seat 374 engageable with the centering block 371 and connected to the large-diameter connecting pin 331 coupled with the lower end of the slide piece 33. The cylinder body 372 is fixed to the upper end 351T of the lifting plate 351. The slide piece 33 and the large-diameter connecting pin 331 are connected to each other with a lock pin 331P and the large-diameter connecting pin 331 and the cylindrical body 373 are connected to each other with another lock pin 331P. The small-diameter connecting pin 352 is screw-fastened to the lower end of the large-diameter connecting pin 331. The spring member 354 is mounted between the spring receiving member 353 formed at the lower end of the small-diameter connecting pin 352 and a spring groove 351Q formed in the lower end 351B of the lifting plate 351.

At the timing of die closing of the injection molding die 30, a rod of the cylinder body 372 moves forward in an arrow-F direction, causing the centering block 371 to engage with the recessed seat 374. At that time, the slide piece 33 contacts with the insert die 36 inserted in the movable die 32 and thereby is subjected to positioning (center alignment). This positioning (center alignment) of the slide piece 33 ensures accuracy of cavity sizes for the panel body w1 and the stepped reinforcing ribs w2, thus enabling reduction of molding defects such as welds and voids. After positioning of the slide piece 33, the rod of the cylinder body 372 is retracted, moving the centering block 371 away from the recessed seat 374. After the molten resin is filled in the cavity, the resin starts to shrink by cooling. The slide piece 33 is allowed to move in an arrow-H direction following resin shrinkage. Since the slide piece 33 moves following resin shrinkage, it is possible to greatly reduce the generation of sink in the front surface of the panel body w1.

<<Second Embodiment>>

A resin vehicle part manufacturing method and a resin vehicle part in a second embodiment according to the present invention will be explained below, referring to accompanying drawings.

<Structure of Resin Vehicle Part>

Figure 12:
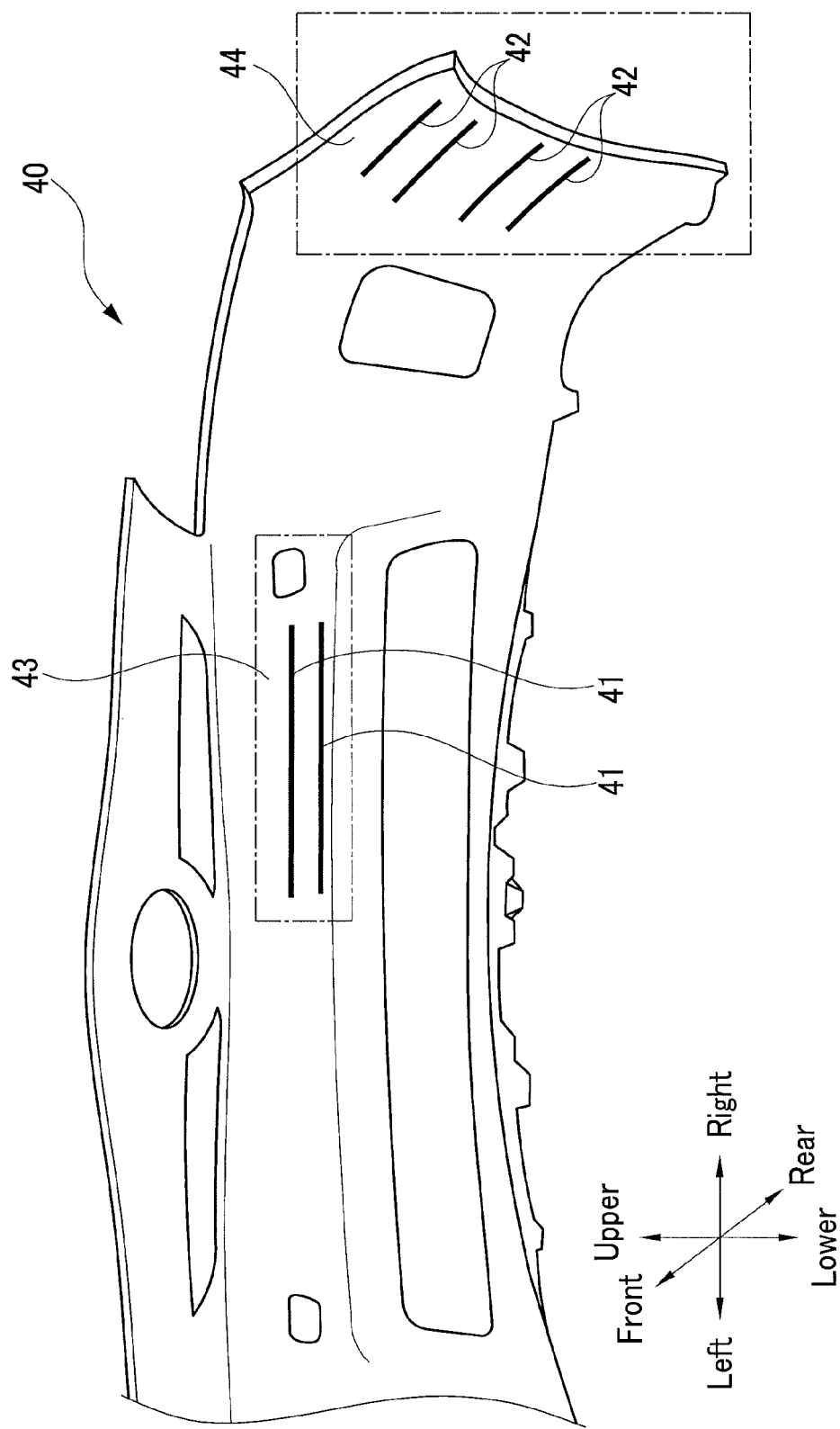
FIG. 12 is a schematic perspective view of a resin vehicle part (a front bumper) in a second embodiment according to the present invention.

A resin vehicle part in the second embodiment according to the present invention will be first explained for example in the form of a front bumper of a vehicle. FIG. 12 is a schematic perspective view of the resin vehicle part (the front bumper) in the second embodiment according to the present invention.

As shown in FIG. 12, a resin vehicle part (a front bumper) 40 is provided with a plurality of stepped reinforcing ribs 41 and 42 each standing on a back surface of panel bodies 43 and 44 as with the resin vehicle part (the front bumper) 10 in the first embodiment. Herein, the stepped reinforcing ribs 41 and 42 are illustrated with thick lines for convenience. The panel body 43 will be located in the front of a vehicle and is provided with a flat surface having a small sectional curvature and extending in a right-left direction. The stepped reinforcing ribs 41 standing on the panel body 43 are two ribs arranged one above the other, each extending in nearly parallel with each other and in a linear form in the right-left direction. The panel body 44 will be located in the side of the vehicle and is provided with a flat surface having a small sectional curvature and extending in a front-rear direction. The stepped reinforcing ribs 42 standing on the panel body 44 are four ribs arranged one above another, each extending in nearly parallel with each other and in a linear form in the front-rear direction. The detailed structure of the stepped reinforcing ribs 41 and 42 is common with the stepped reinforcing ribs 261 in the first embodiment explained above (see FIGS. 4 and 5) and thus the explanation thereof is omitted herein. Arrowed directions given in FIG. 12 indicate right, left, upper, lower, rear, and front sides of the front bumper 40 when mounted in a vehicle.

<Manufacturing Method of Resin Vehicle Part>

Figure 13:
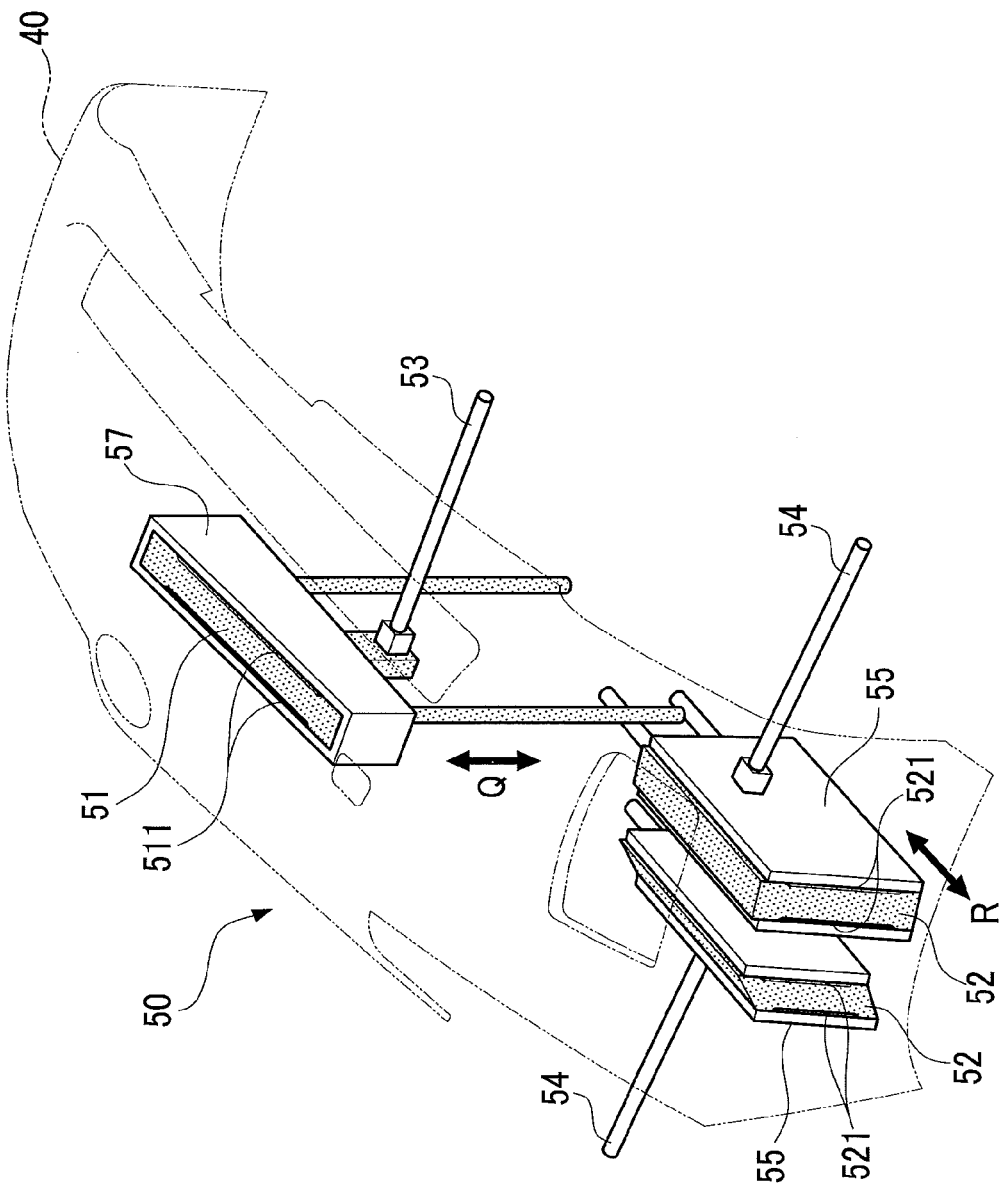
FIG. 13 is a schematic perspective view of a slide piece and an insert die of an injection molding die for forming the resin vehicle part shown in FIG. 12.
Figure 14:
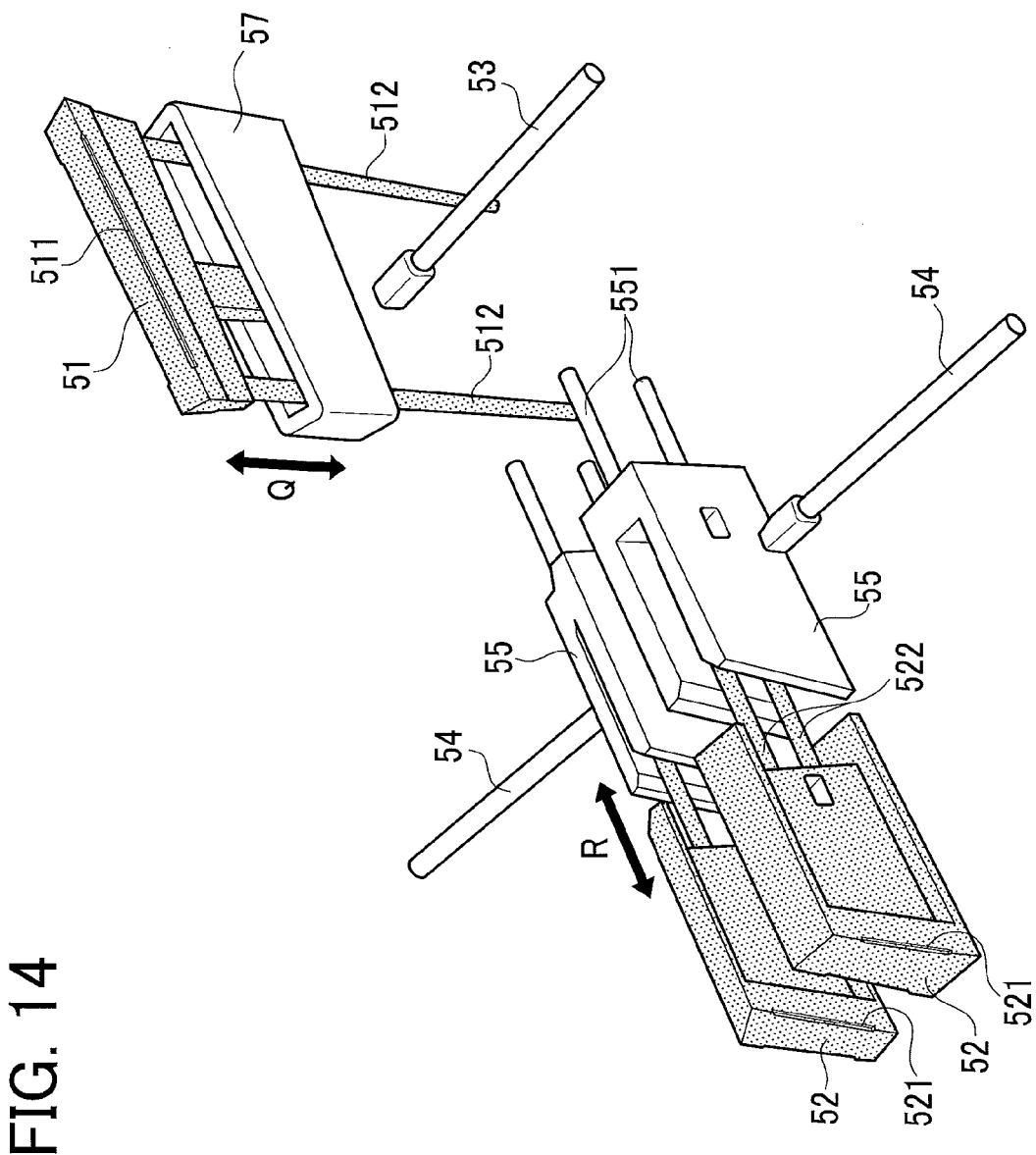
FIG. 14 is an explanatory view of operations of the slide piece and an insert die shown in FIG. 13.
Figure 15:
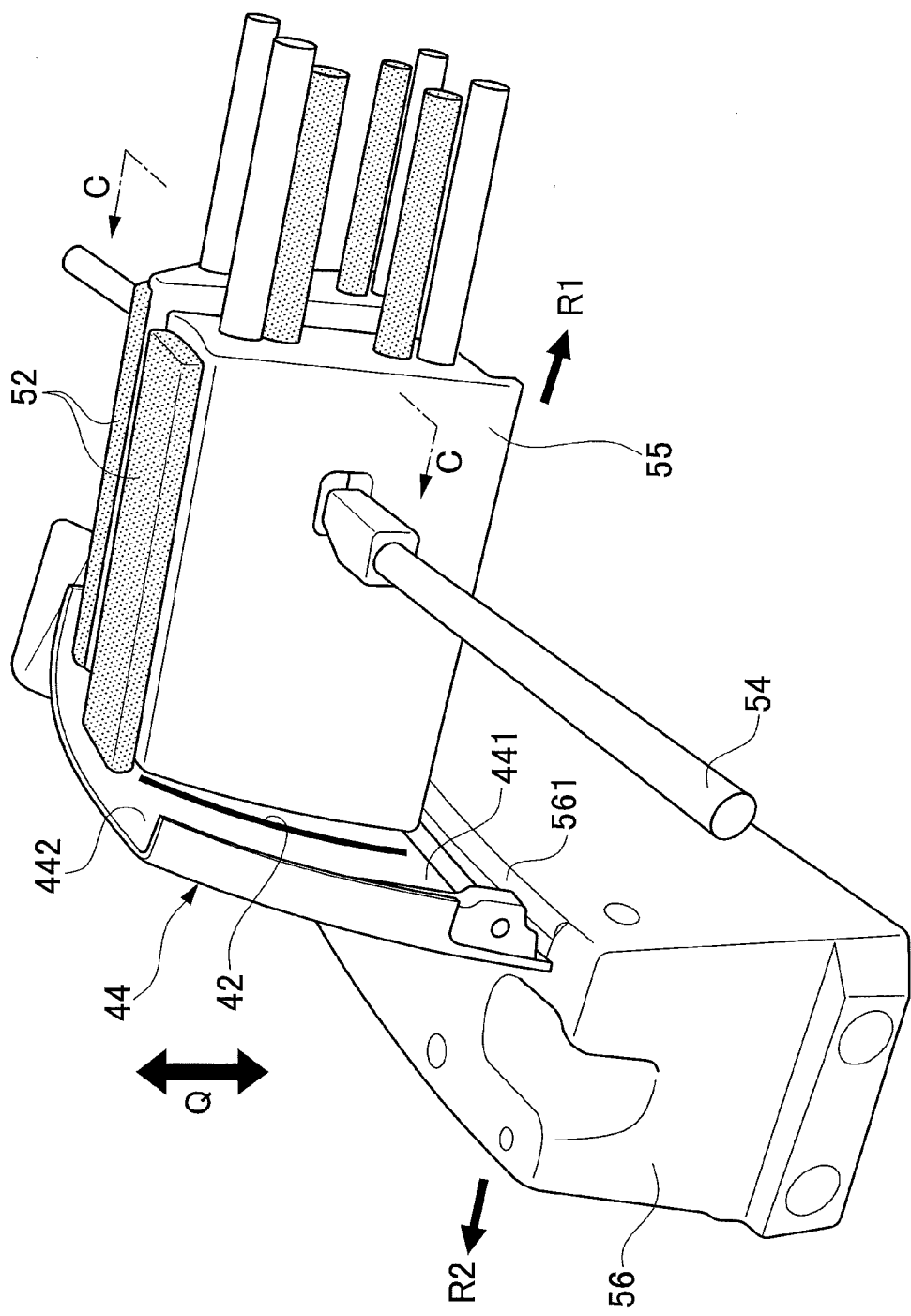
FIG. 15 is a perspective view of a second slide piece and a second insert die during product demolding.
Figure 16:
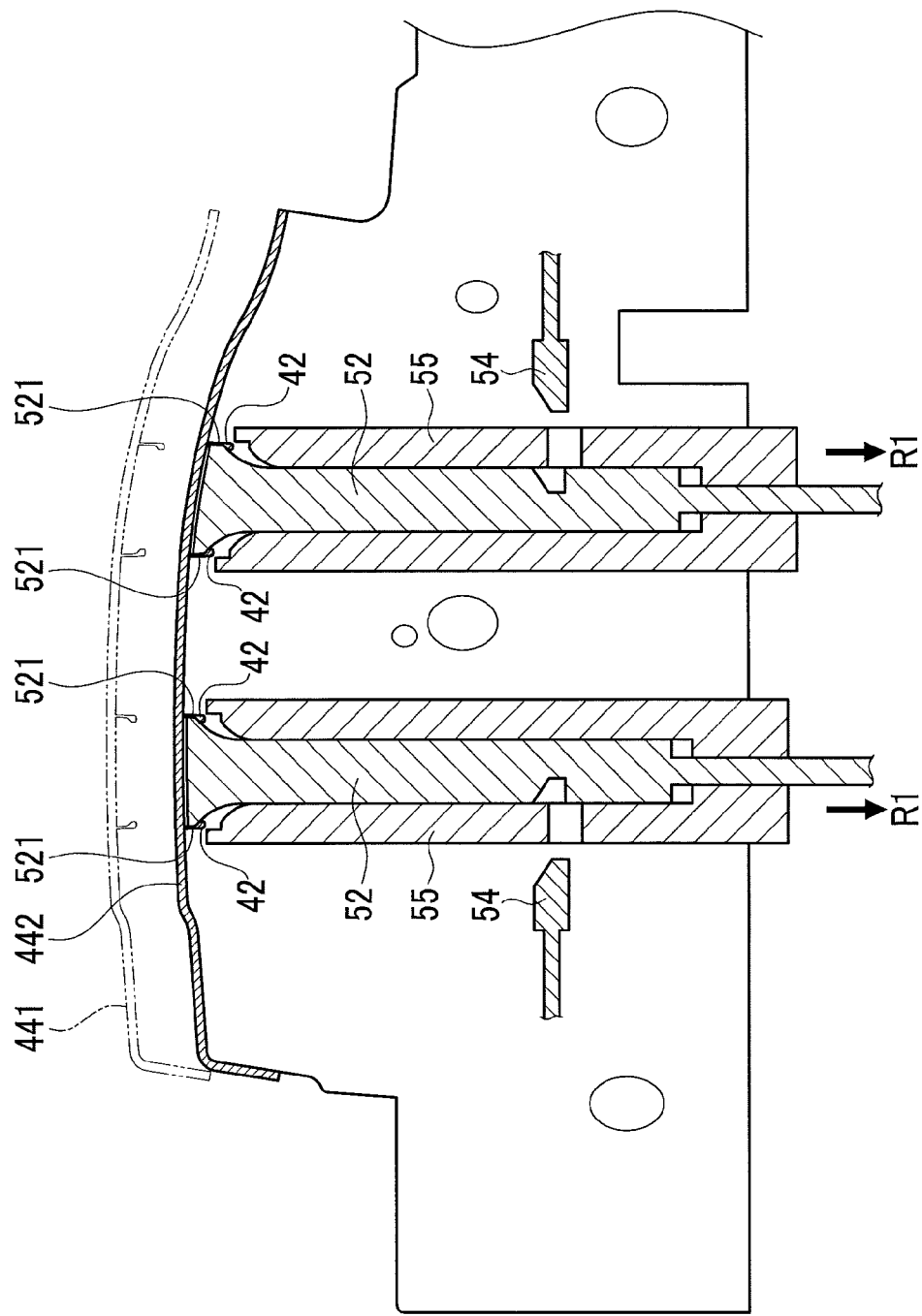
FIG. 16 is a cross sectional view along C-C in FIG. 5.
Figure 17:
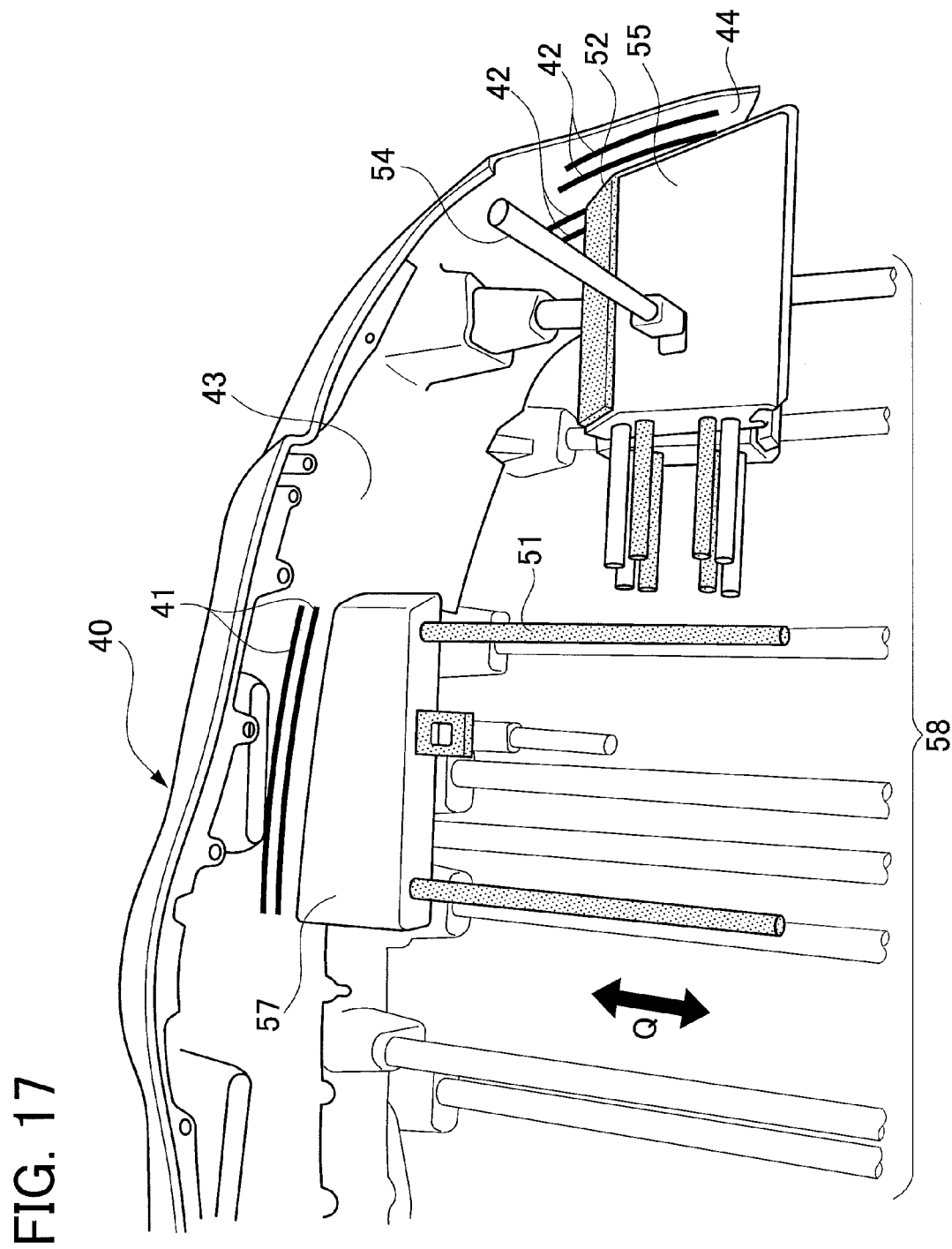
FIG. 17 is a schematic perspective view of a lifter part, a slide piece, and an insert die to demold the resin vehicle part shown in FIG. 12.
Figure 18:
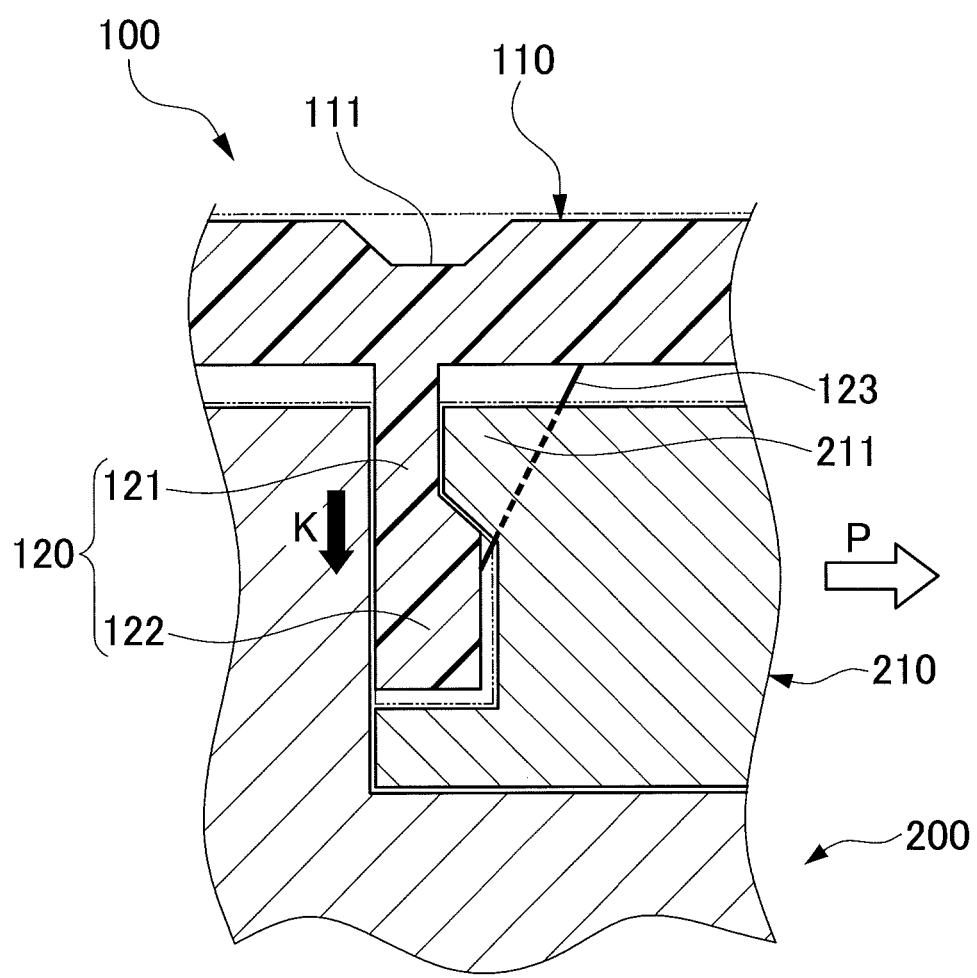
FIG. 18 is a schematic cross sectional view of a slide piece in a conventional injection molding die.

Next, a method for manufacturing the resin vehicle part (the front bumper) 40 by an injection molding method will be explained. FIG. 13 is a schematic perspective view of a slide piece and an insert die of an injection molding die for forming the resin vehicle part shown in FIG. 12. FIG. 14 is an explanatory view of operations of the slide piece and the insert die shown in FIG. 13. FIG. 15 is a perspective view of a second slide piece and a second insert die at the time of demolding a product. FIG. 16 is a sectional view along C-C in FIG. 15. FIG. 17 is a schematic perspective view of a lifting member, a slide piece, and an insert die to take out the resin vehicle part shown in FIG. 12.

As shown in FIGS. 13 and 14, an injection molding die 50 for injection molding the resin vehicle part 40 is provided with a first slide piece 51 and a first insert die 57 for forming the stepped reinforcing ribs 41 standing on the back surface of the panel body 43 to be disposed in the front of a vehicle and a second slide piece 52 and a second insert die 55 for forming the stepped reinforcing ribs 42 standing on the back surface of the panel body 44 to be disposed in the side of the vehicle. The first slide piece 51 and the first insert die 57 are unitized and the second slide pieces 52 and the second insert dies 55 are unitized, each unit being mounted in a movable die. FIG. 13 shows the injection molding die 50 in a state before molten resin is filled. FIG. 14 shows the injection molding die 50 in a state after molten resin is filled. In FIGS. 13 and 14, a fixed die and a movable die are not illustrated for the purpose of easy understanding.

The first slide piece 51 is a nearly rectangular block element inserted in the first insert die 57 formed in a nearly rectangular cylindrical shape so that the first slide piece 51 is slidable in a demolding direction (an arrow-Q direction). The first slide piece 51 is supported in the first insert die 57 with guide bars 512 or the unillustrated movable die. The first slide piece 51 has no drive source. When pushed by leading end portions of the stepped reinforcing ribs 41, the first slide piece 51 is moved to follow the stepped reinforcing ribs 41. In longitudinally extending gaps between the first slide piece 51 and the first insert die 57, cavities 511 are formed to form the stepped reinforcing ribs 41. The first insert die 57 is fixed to the movable die not shown.

Each of the second slide pieces 52 is a nearly rectangular block element inserted in the corresponding second insert die 55 formed in a nearly U shape so that the second slide piece 52 is slidable in a direction (an arrow-R direction) different to the demolding direction. The second slide piece 52 is supported in the second insert die 55 with guide bars 522 or the unillustrated movable die. In longitudinally extending gaps between the second slide piece 52 and the second insert die 55, cavities 521 are formed to form the stepped reinforcing ribs 42. The cavities 521 are formed linearly in a nearly same direction with the demolding direction (the arrow-Q direction) of the injection molding die 50. The second insert die 55 is supported by the movable die not shown with the guide bars 551 in the same direction (the arrow-R direction) with the second slide piece 52. The second slide piece 52 has no drive source. When pushed by leading end portions of the stepped reinforcing ribs 42, the second slide piece 52 is moved to follow the stepped reinforcing ribs 42. In the injection molding die 50, two sets of second slide pieces 52 and second insert dies 55 are adjacently arranged.

In the injection molding die 50, there are provided lock pins 53 and 54 for fixing the first slide piece 51 and the second slide pieces 52 in respective positions. Before filling molten resin in the injection molding die 50, the lock pins 53 and 54 are engaged in the first slide piece 51 and the second slide pieces 52 respectively. After filling the molten resin in the injection molding die 50, the lock pins 53 and 54 are then released. The lock pins 54 can simultaneously lock or release the second slide pieces 52 and the second insert dies 55.

The lock pins 53 and 54 for fixing the first slide piece 51 and the second slide pieces 52 in respective positions are unlocked according to a signal of a pressure sensor or the like that detects filling completion timing of molten resin in the injection molding die 50. Since the lock pins 53 and 54 are released after the molten resin is filled in the injection molding die 50, the first slide piece 51 and the second slide pieces 52 pushed by the leading end portions of the stepped reinforcing ribs 41 and 42 during shrinkage in the height direction of the reinforcing ribs 41 and 42 and moved in a direction to come close to the panel bodies 43 and 44.

As shown in FIGS. 15 and 16, when demolding, a movable core (commonly called "turn-up core") is moved in an arrow-R2 direction in order to release an inward flange formed on a lower end side 441 of the side panel body 44 from the movable die. At that time, a claw 561 formed in the movable core 56 abuts against the flange, deforming only the lower end side 441 of the panel body 44 in the arrow-R2 direction. However, an upper end side 442 of the panel body 44 is not deformed and thus the second slide pieces 52 attempt to stay in the same positions. Thus, the stepped reinforcing ribs 42 standing on the lower end side 441 of the panel body 44 attempt to separate from the second slide pieces 52, thereby pushing the second insert dies 55 in an arrow-R1 direction. When the second insert dies 55 are moved in the arrow-R1 direction, the cavities 521 formed in the gaps between the second slide pieces 52 and the second insert dies 55 are expanded in the arrow-R1 and the arrow-R2 directions each nearly perpendicular to the longitudinal direction of the cavities. Consequently, when demolding a product in the demolding direction (the arrow-Q direction), the stepped reinforcing ribs 42 standing on the side panel body 44 can be demolded sequentially from the lower end side 441 to the upper end side 442 of the panel body 44 by avoiding interference with the second slide pieces 52. It is to be noted that when the lock pins 54 are locked, the second insert dies 55 moved in the arrow-R1 direction will be pushed by inclined end faces of the lock pins 54 and thus return to respective original positions.

As shown in FIG. 17, when demolding, a lifting part 58 pushes an appropriately formed receiving part in the demolding direction (the arrow-Q direction), thereby lifting up the resin vehicle part (the front bumper) 40 to a predetermined height.

This can demold, without stress, the stepped reinforcing ribs 41 and 42 formed respectively by a set of the first slide piece 51 and the first insert die 57 and a set of the second slide pieces 52 and the second insert dies 55.

<<Operations and Effects>>

As explained above, according to the resin vehicle part manufacturing method in the first embodiment according to one aspect of the invention, the injection molding die 30 of the resin vehicle part includes the movable slide piece 33 to form the stepped reinforcing rib w2. After molten resin is filled in the injection molding die 30, the slide piece 33 is pushed by the leading end portion w2b of the stepped reinforcing rib w2 and moved in the direction to come close to the panel body w1 when the stepped reinforcing rib w2 shrinks in the height direction. Accordingly, the pulling force associated with the shrinkage of the stepped reinforcing rib w2 does not act on the panel body w1. This can greatly reduce the generation of sink in the front surface w11 of the panel body w1. The pulling force also does not act on the base end portion w2a of the stepped reinforcing rib w2. Even when the base end portion w2a of the stepped reinforcing rib w2 is formed to be thin in wall thickness, it is therefore possible to largely reduce a possibility of breakdown or fracture of the rib w2. Furthermore, since the slide piece 33 is moved in the direction to come close to the panel body w1 in accordance with the shrinkage of the stepped reinforcing rib w2 in the height direction, there is no need to provide any special drive device for moving the slide piece 33. Thus, a simple die structure can reduce the generation of sink and others in the front surface w11 of the panel body w1 and achieve thin wall thickness and high rigidity of the panel body w1 and the stepped reinforcing rib w2.

According to the first embodiment, the slide piece 33 is movably connected to the lifting plate 351 of the lifting device 35 provided in the injection molding die 30 through the spring member 354 that urges the slide piece 33 in a direction to come close to the lifting plate 351. The slide piece 33 is moved upward together with the lifting plate 351 during product demolding. When the lifting plate 351 of the lifting device 35 is moved up, the slide piece 33 is also moved up at the same time. This causes the stepped reinforcing rib w2 to release out of the cavity w20 of the injection molding die 30. Thus, the injection-molded part w can be easily demolded. Further, since the spring member 354 urges the slide piece 33 in the direction to come close to the lifting plate 351, when the molten resin is being filled in the cavity w10 for the panel body w1, the slide piece 33 does not protrude into the cavity w10 for the panel body w1. Accordingly, the slide piece 33 does not interrupt a flow of the molten resin in the cavity w10 for the panel body w1. Thus, molding defects such as weld lines and voids are not generated in the panel body w.

According to the first embodiment, the injection molding die 30 includes the insert die 36 slidably fitted in the slide piece 33. the molten resin is filled in the cavity w20 provided in the gap between the slide piece 33 and the insert die 36 to form the stepped reinforcing rib w2. By detaching the slide piece 33 from the insert die 36 and adjusting the above gap, the thickness of the stepped reinforcing rib w2 can be easily changed. In particular, it is possible to easily form the base end portion w2a with thin wall thickness, thus enabling greatly reducing the generation of sink in the front surface of the panel body w1.

According to the first embodiment, the groove-shaped cavities 33ah are provided in the shoulder portions of the slide piece 33, each groove-shaped cavity 33ah being communicated with the cavity w20 for forming the stepped reinforcing rib w2.

The molten resin is filled in the groove-shaped cavities to form the triangular reinforcing ribs w2d for reinforcing the root w2a1 of the base end portion w2a of the stepped reinforcing rib w2. Accordingly, the base end portion w2a of the stepped reinforcing rib w2 is less likely to incline during product demolding. This can reduce deformation strain of the panel body w1.

According to the second embodiment of another aspect of the present invention, the injection molding die 50 of the resin vehicle part 40 includes the first slide piece 51 movably in the demolding direction (the arrow-Q direction) for forming one stepped reinforcing rib 41 standing on the front panel body 43 and also includes the second slide pieces 52 in the different direction (the arrow-R direction) from the demolding direction for forming other stepped reinforcing ribs 42 standing on the side panel body 44. After the molten resin is filled in the injection molding die 50, the first slide piece 51 and the second slide pieces 52 are pushed respectively by the leading end portions of the stepped reinforcing ribs 41 and 42 during shrinkage in the height direction of each of the stepped reinforcing ribs 41 and 42, and moved in the direction to come close to the panel bodies 43 and 44. The pulling force associated with the shrinkage of each of the stepped reinforcing ribs 41 and 42 respectively standing on the panel bodies 43 and 44 formed in the different directions does not act on the panel bodies 43 and 44. Thus, it is possible to largely reduce the generation of sink in the front surfaces of the panel bodies 43 and 44. Furthermore, since the pulling force also does not act on the base end portions of the stepped reinforcing ribs 41 and 42, it is possible to greatly reduce a possibility of breakage or fracture of the base end portions of the stepped reinforcing ribs 41 and 42 even if they are formed with thin wall thickness. Still further, the first slide piece 51 and the second slide pieces 52 are moved respectively in the directions to come close to the panel bodies 43 and 44 in association with the shrinkage of the stepped reinforcing ribs 41 and 42 in the height direction. Thus, there is no need to provide any special drive device for moving the first slide piece 51 and the second slide pieces 52. Therefore, as with the resin vehicle part 40 provided with one stepped reinforcing rib 41 standing on the front panel body 43 and the other stepped reinforcing rib 42 standing on the side panel body 44, even the resin vehicle part provided with the stepped reinforcing ribs standing on the panel body formed in the direction different from the demolding direction can be manufactured with reduced generation of sink and others in the front surfaces of the panel bodies 43 and 44 by a simple die structure, thereby achieving thin wall thickness and high rigidity of the panel bodies 43 and 44 and the stepped reinforcing ribs 41 and 42.

According to the second embodiment, moreover, the injection molding die 50 is provided with the lock pins 53 and 54 for fixing the first slide piece 51 and the second slide pieces 52 in respective positions. Before molten resin is filled in the injection molding die 50, the lock pins 53 and 54 are engaged in the first slide piece 51 and the second slide pieces 52. After the molten resin is filled in the injection molding die 50, the lock pins 53 and 54 are released from the first slide piece 51 and the second slide pieces 52. This configuration enables fixing the first slide piece 51 and the second slide pieces 52 in normal positions when the molten resin is filled in the injection molding die 50 and allowing free movement of the first slide piece 51 and the second slide pieces 52 after the molten resin is filled in the injection molding die 50. As a result, the first slide piece 51 and the second slide pieces 52 can follow the shrinkage of each stepped reinforcing rib 41 and 42 in the height direction and move in the direction to come close to the panel bodies 43 and 44 respectively.

It is to be noted that the lock pins 53 and 54 for fixing the first slide piece 51 and the second slide pieces 52 in respective positions are preferably released according to a signal of a pressure sensor or the like for detecting the timing of completion of filling the molten resin in the injection molding die 50. Accordingly, the time of unlocking the lock pins 53 and 54 can be synchronized with the time of starting the shrinkage of each of the stepped reinforcing ribs 41 and 42. This can further reduce the occurrence of sink and others in the panel body.

According to the second embodiment, the injection molding die 50 includes the second insert dies 55 in which the second slide pieces 52 are slidably fitted. The molten resin is filled in the cavities 521 provided in the gaps between the second slide pieces 52 and the second insert dies 55, thereby forming the stepped reinforcing ribs 42. By detaching the second slide pieces 52 from the second insert dies 55 and adjusting the gaps, the thickness of the stepped reinforcing ribs 42 can be easily changed. In particular, it is possible to easily form the base end portions with thin wall thickness, thus enabling greatly reducing the generation of sink and others in the front surface of the panel body 44.

According to the second embodiment, the second insert dies 55 are moved in the direction (the arrow-R1 direction) to expand the cavities 521 of the stepped reinforcing ribs 42 formed in the gaps between the second slide pieces 52 and the second insert dies 55 when a product is being demolded. This makes it possible to easily demold the stepped reinforcing ribs 42 standing on the side panel body 44 from the second slide pieces 52. This can greatly reduce the generation of sink and others in the front surface of the side panel body 44.

According to the second embodiment, the cavities 521 of the stepped reinforcing ribs 42 formed in the gaps between the second slide pieces 52 and the second insert dies 55 are formed linearly in almost the same direction as the demolding direction (the arrow-Q direction) of the injection molding die 50. Accordingly, the stepped reinforcing ribs 42 formed in the gaps between the second slide pieces 52 and the second insert dies 55 can be moved upward along the cavities 521 when a product is taken out. Thus, excessive pulling force does not occur in the side panel body 44. This enables greatly reducing the generation of sink and others in the front surface of the side panel body 44.

According to another aspect of the present invention, in the resin vehicle parts 10, 20, and 40 manufactured by the resin vehicle part manufacturing method described in any one of the first and second embodiments explained above, the stepped reinforcing ribs 15-17, 25, 26, 41, and 42 are provided to extend linearly on the back surfaces of the corresponding panel bodies 11, 21, 43, and 44 and arranged in nearly parallel with each other and spaced from each other. Accordingly, regions of the panel body 11, 21, 43, and 44, each region having a small sectional curvature and hence a relatively reduced surface rigidity, can be effectively and averagely reinforced by the plurality of stepped reinforcing ribs 15-17, 25, 26, 41, and 42. Since the slide piece, first slide piece, and second slide pieces for forming the stepped reinforcing ribs are formed in constant cross section and in linear form, a simple die structure can be used.

According to another aspect of the invention, the stepped reinforcing ribs 15-17, 25, 26, 41, and 42 are provided with triangular reinforcing ribs 261e each connecting the back surface of the panel body 11, 21, 43, and 44 to the root of the base end portion. Accordingly, even when the leading end portions of the stepped reinforcing ribs 15-17, 25, 26, 41, and 42 abut on the slide piece, first slide piece, and second slide pieces and thus are inclined during product demolding, the roots of the base end portions of the stepped reinforcing ribs 15-17, 25, 26, 41, and 42 are not inclined, so that strains, deformations, and others are not caused in the front surfaces of the panel bodies 11, 21, 43, and 44. The triangular reinforcing ribs 261e are not connected to the leading end portions of the stepped reinforcing ribs 15-17, 25, 26, 41, and 42 and hence will not increase sink in the front surfaces of the panel bodies 11, 21, 43, and 44 in association with shrinkage of the stepped reinforcing ribs 15-17, 25, 26,41, and 42.

The above described aspects may be changed or modified within the scope of the invention. For instance, in the first embodiment explained above, the spring member 354 urges the slide piece 33 in the direction to come close to the lifting plate 351 (the arrow-M direction), but the invention is not limited thereto. For example, the spring member 354 may urge the slide piece 33 in a direction (an opposite direction to the arrow-M direction) to come away from the lifting plate 351. In this case, it is necessary to hold the slide piece 33 in a positioning (centering) state by the centering device 37 until the molten resin is filled in the cavity of the injection molding die 30.

INDUSTRIAL APPLICABILITY

The present invention is particularly utilizable to a resin vehicle part manufacturing method and a resin vehicle part in which a base end portion of a reinforcing rib standing on a back surface of a panel body is formed to be thin in wall thickness.

REFERENCE SIGNS LIST

10 Resin vehicle part (Front bumper)
11 Panel body
14a-14d Normal portion
15-17 Stepped reinforcing rib
15 First rib
16 Second rib
17 Third rib
20 Resin vehicle part (Side mud guard)
21 Panel body
25, 26 Stepped reinforcing rib
25 Fifth rib
26 Sixth rib
30 Injection molding die
32 Fixed die
32 Movable die
33 Slide piece
33ah Groove-shaped cavity
33bh Groove-shaped cavity
33ch Groove-shaped cavity
35 Lifting device
40 Resin vehicle part (Front bumper)
41, 42 Stepped reinforcing rib
43, 44 Panel body
50 Injection molding die
51 First slide piece
52 Second slide piece
53, 54 Lock pin
55 Second insert die
56 Movable core
57 First insert die
261 Stepped reinforcing rib
261a Base end portion
261b Leading end portion
261c Inclined portion
261d Root
261e Triangular reinforcing rib
332 Protrusion
351 Lifting plate (Lifting part)
354 Spring member (Elastic body)
521 Cavity
w Injection-molded part
w1 Panel body
w2 Stepped reinforcing rib
w2a Base end portion
w2b Leading end portion
w2c Inclined surface
w2d Triangular reinforcing rib

The invention claimed is:

1. A method for manufacturing a resin vehicle part provided with a panel body having a front surface including a design surface and a stepped reinforcing rib formed standing on a back surface of the panel body, the stepped reinforcing rib having a base end portion with a thickness thinner than a leading end portion,
   wherein an injection molding die for the resin vehicle part includes a movable slide piece to form the reinforcing rib,
   after molten resin is filled in the injection molding die, the slide piece is pushed by the leading end portion of the stepped reinforcing rib and moved in a direction to come close to the panel body according to shrinkage of the stepped reinforcing rib in a height direction.

2. The method for manufacturing a resin vehicle part according to claim 1, wherein the slide piece is movably connected to a lifting part of a lifting device provided in the injection molding die through an elastic element that urges the slide piece in a direction to come close to the lifting part, and the slide piece is moved upward together with the lifting part during product demolding.

3. The method for manufacturing a resin vehicle part according to claim 1, wherein the injection molding die includes an insert die in which the slide piece is slidably fitted, and the method includes filling molten resin in a cavity provided in a gap between the slide piece and the insert die to form the stepped reinforcing rib.

4. The method for manufacturing a resin vehicle part according to claim 3, wherein a groove-shaped cavity is provided in a shoulder of the slide piece or the insert die, the groove-shaped cavity being communicated with the cavity for forming the stepped reinforcing rib, and the method includes filling molten resin in the groove-shaped cavity to form a triangular reinforcing rib for reinforcing only a root of the base end portion of the stepped reinforcing rib.

5. A method for manufacturing a resin vehicle part provided with a panel body having a front surface including a design surface and a stepped reinforcing rib formed standing on a back surface of the panel body, the reinforcing rib having a base end portion with a thickness thinner than a leading end portion,
   wherein an injection molding die for the resin vehicle part includes a first slide piece for forming one stepped reinforcing rib so that the first slide piece is movable in a demolding direction and a second slide piece for forming the other stepped reinforcing rib so that the second slide piece is movable in a direction different from the demolding direction, after molten resin is filled in the injection molding die, the first slide piece and the second slide piece are pushed by the leading end portions of the stepped reinforcing ribs in a direction to come close to the panel body according to shrinkage of the stepped reinforcing ribs in a height direction.

6. The method for manufacturing a resin vehicle part according to claim 5, wherein
   the injection molding die includes lock pins for fixing the first slide piece and the second slide piece in respective positions,
   the method includes
   locking the lock pins in the first slide piece and the second slide piece before the molten resin is filled in the injection molding die, and
   releasing the lock pins from the first slide piece and the second slide piece after the molten resin is filled in the injection molding die.

7. The method for manufacturing a resin vehicle part according to claim 5, wherein the injection molding die includes a second insert die in which the second slide piece is slidably fitted, the method includes filling molten resin in a cavity provided in a gap between the second slide piece and the second insert die to form the stepped reinforcing rib.

8. The method for manufacturing a resin vehicle part according to claim 7, wherein the method includes moving the second insert die in a direction to expand a cavity of the stepped reinforcing rib formed in the gap between the second slide piece and the second insert die during product demolding.

9. The method for manufacturing a resin vehicle part according to claim 7, wherein the cavity for the stepped reinforcing rib formed in the gap between the second slide piece and the second insert die is formed linearly in almost the same direction as the demolding direction of the injection molding die.

* * * * *